United States Patent [19]
Ogino et al.

[11] Patent Number: 5,355,187
[45] Date of Patent: Oct. 11, 1994

[54] LIQUID CRYSTAL PROJECTION DISPLAY

[75] Inventors: Masanori Ogino, Yokohama; Yoshiaki Iwahara, Yokosuka; Takeo Yamada, Yokohama; Shigeru Mori, Chigasaki; Fumio Inoue; Akio Yamamoto, both of Yokohama, all of Japan

[73] Assignee: Hitachi, Ltd., Tokyo, Japan

[21] Appl. No.: 29,640

[22] Filed: Mar. 11, 1993

[30] Foreign Application Priority Data

Mar. 13, 1992 [JP] Japan .................. 4-054749

[51] Int. Cl.$^5$ .............................................. G03B 21/00
[52] U.S. Cl. ...................................... 353/38; 353/102; 359/40
[58] Field of Search ...................... 353/31, 34, 38, 102, 353/122; 359/40, 48, 49, 69, 228, 455, 456, 457

[56] References Cited

U.S. PATENT DOCUMENTS

| | | | |
|---|---|---|---|
| 4,770,525 | 9/1988 | Umeda et al. | 353/38 |
| 5,048,949 | 9/1991 | Sato et al. | 353/77 |
| 5,066,099 | 11/1991 | Yoshida et al. | 359/457 |
| 5,135,300 | 8/1992 | Toide et al. | 358/253 |
| 5,206,761 | 4/1993 | Ogino | 359/457 |
| 5,231,432 | 7/1993 | Glenn | 353/34 |

Primary Examiner—William A. Cuchlinski, Jr.
Assistant Examiner—William C. Dowling
Attorney, Agent, or Firm—Antonelli, Terry, Stout & Kraus

[57] ABSTRACT

A liquid crystal projection display capable of functioning at a high light capturing efficiency and a high relative corner illuminance comprises a light source means including a light source, a liquid crystal panel means, a projection lens means and a screen means. A liquid lens formed by sealing a liquid in a space between opposite transparent members is disposed near the light source or the real image of the light source to enhance the relative corner illuminance without reducing the light capturing efficiency by multiplying the angle of divergence of light rays emitted by the light source by the reciprocal of the refractive index of the liquid. A first optical system disposed on the entrance side of the liquid crystal panel is provided with a relative corner illuminance enhancing means comprising a first light converging means disposed relatively near to the light source means, and a second light converging means disposed relatively remote from the light source means. The first light converging means enhances the relative corner illuminance on the entrance surface of the second light converging means.

8 Claims, 19 Drawing Sheets

40% H × 80%V
= 32% AREA $RCI = \cos^4 \alpha$ 0.25

$E(\alpha) = \sin^2 \alpha$ $$a_0 = \sin^{-1} \frac{\sin a_P}{n}$$

Ex. $\begin{cases} a_P = 42° \\ n = 1.5 \end{cases}$ $a_0 = 26.5°$ $\therefore RCI = \cos^4 a_0 = 0.64$ FIG. 22a
FIG. 22b
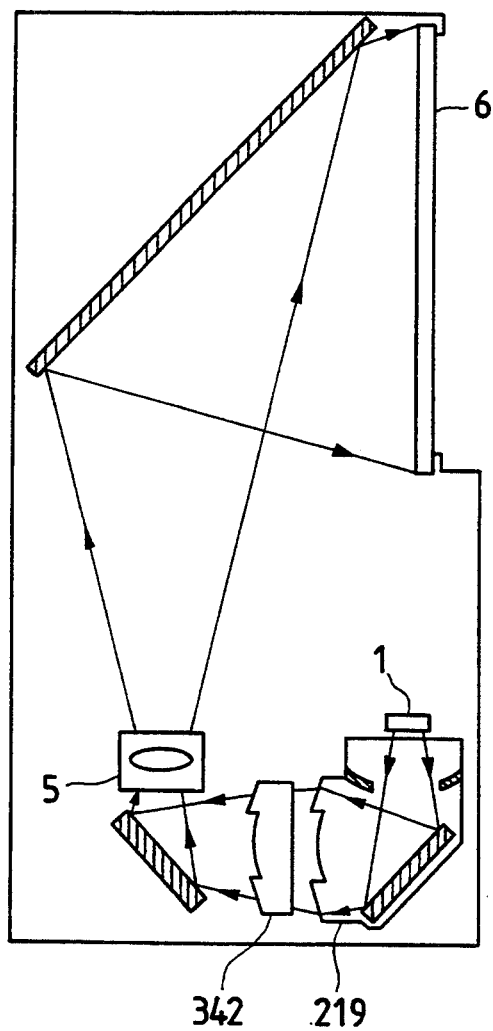
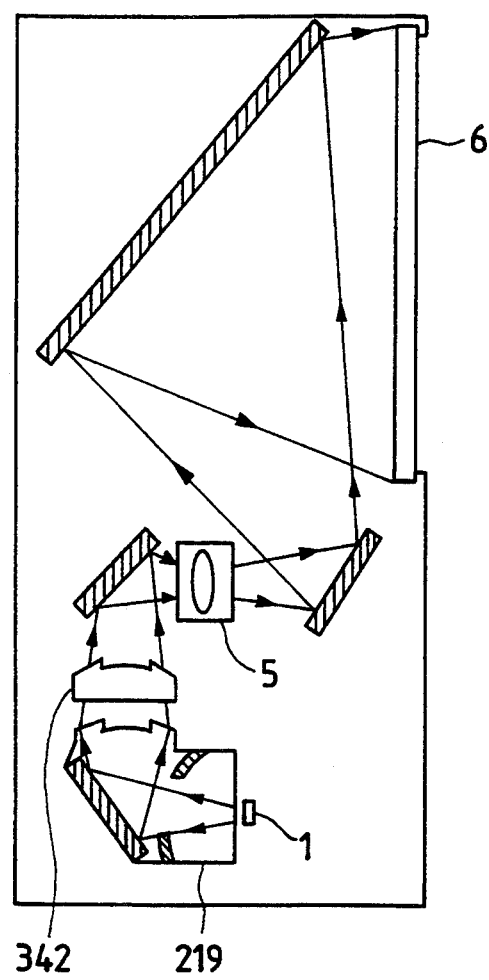

LIQUID CRYSTAL PROJECTION DISPLAY

BACKGROUND OF THE INVENTION

1. Field of the Invention

The present invention relates to a liquid crystal projection display having excellent relative corner illuminance characteristics.

2. Description of the Prior Art

Referring to FIG. 1a showing a prior art liquid crystal projection display of a one-panel one-lens type, there are shown a surface light source 1, a Fresnel collimator lens 2, a liquid crystal panel 3 of about 250 mm in diagonal length, 200 mm in width, 150 mm in height and about 2 mm in thickness, a converging Fresnel lens 4, a projection lens 5 and a screen 6. In FIG. 1a, $\beta$ and $\beta'$ are angles of view and $\omega$ (rad) is the angle of divergence of light rays passing through the liquid crystal panel 3. An image formed on the liquid crystal panel 3 is focused on the screen 6 by the projection lens 5. As is generally known, the light modulating characteristics of the generally known TN (twisted nematic) liquid crystal panel are dependent on the inclination of the transmitted light rays. The mode of dependence of the light modulating characteristics on the incidence angle is anisotropic; light rays diverge in a narrower directivity angle in the direction of the plane of polarization and diverges in a wider directivity angle in a direction perpendicular to the plane of polarization. In an ordinary TN liquid crystal panel, the direction of the narrower directivity angle corresponds to a vertical direction, and the direction of the wider angle corresponds to a horizontal direction. Accordingly, an optical system capable of reducing the angle of divergence in the direction of the narrower directivity angle of the liquid crystal panel must be used to enable the liquid crystal panel to function in satisfactory light modulating characteristics, i.e., to form an image of a high contrast. It is empirically known that the contrast C is approximately equal to $6/\omega^2$. When reproducing a natural picture, the contrast C must be 100 or above to reproduce the natural picture in high contrast. Accordingly, the angle $\omega$ of divergence must be about 0.25 rad or below.

The liquid crystal panel 3 has a surface provided with $640 \times 480$ pixels of about 0.3 mm square in area. FIG. 1b shows the shape of a pixel for a monochromatic liquid crystal panel, in which a shaded portion is the blackened area that does not transmit light rays. FIG. 1c shows the shape of one pixel trio for reproducing color images, in which a shaded portion is a blackened area, and R, G and B indicate red, green and blue pixels. The ratio of the effective area of to the total area of the pixel of FIG. 1b is about 64%, and that of the pixel trio of FIG. 1c is about 32%. The relative corner illuminance (RCI) of the prior art is shown in FIG. 2a, in which the converging angle $\alpha$ of the light rays emitted by the surface light source 1 of FIG. 1a is measured to the right on the horizontal axis, and the relative corner illuminance on the plane of incidence of the Fresnel collimator lens 2 is measured upward on the vertical axis. The distribution of relative corner illuminance on the Fresnel collimator lens 2 is substantially the same as that on the liquid crystal panel 3. As is generally known, the distribution of relative corner illuminance conforms to the $Cos^4$ law. FIG. 2b is a graph showing the variation of the light capturing efficiency $E(\alpha)$ of the Fresnel collimator lens 2 with the angle $\alpha$ of convergence. As is generally known, the variation of the light capturing efficiency $E(\alpha)$ conforms to the $Sin^2$ law. As is obvious from FIGS. 2a and 2b, whereas $E(\alpha) = 100\%$ when and $RCI = 0\%$ when $\alpha = \pi/2$, $E(\alpha) = 50\%$ and $RCI = 25\%$ when $\alpha = \pi/4$. The relative corner illuminance needs to be about 50% to form an image in a satisfactory quality. Accordingly, as is obvious from FIG. 2a, the converging angle $\alpha$ must be about 0.57 rad or below and, consequently, the light capturing efficiency $E(\alpha)$ is reduced inevitably to 29% as shown in FIG. 2b. Thus, it is difficult for the prior art to improve the relative corner illuminance without reducing the light capturing efficiency $E(\alpha)$.

As mentioned above, the light capturing efficiency conforms to the $Sin^2$ law and the relative corner illuminance conforms to the $Cos^4$ law when a single flat collimator lens and a single small surface light source disposed at the focal point of the flat collimator lens are used in combination. Therefore, there is a reciprocal relation between the light capturing efficiency and the relative corner illuminance that the sum of the square root of the relative corner illuminance and the light capturing efficiency is always 1 or not greater than 1.

It is possible to prove that the reciprocal relation applies also to the combination of a single paraboloidal collimator mirror and a single point light source disposed at the focal point of the paraboloidal collimator mirror. The ratio of collimated light, namely, the light capturing efficiency is equal to $sin^2\ 0.5\alpha$ and the relative corner illuminance is equal to $cos^4 0.5\alpha$, where $\alpha$ is convergence angle. Accordingly, the sum of the square root of the relative corner illuminance and the light capturing efficiency is equal to 1.

FIG. 3a shows a portion of the converging Fresnel lens 4 of FIG. 1a. In FIG. 3a, the incident light rays 9 are represented by a continuous line, the normal outgoing light rays 10 are represented by continuous line and ghost light rays 12, namely, undesired interference light rays, are represented by broken lines. Some of the incident light rays 9 reflected by the plane 4' of exit of the converging Fresnel lens 4, namely, ghost light rays, are reflected by the plane 11 of incidence of the converging Fresnel lens 4 in total reflection. The ghost light rays 12 form a ghost image on the screen.

A means for reducing ghost interference disposes the converging Fresnel lens 4 in a reverse position as shown in FIG. 3b. However, when the converging Fresnel lens 4 is disposed in a reverse position, some of the incident light rays 9 falling on shaded portions 9'' do not travel in the correct direction of outgoing light rays 10, which reduces the relative corner illuminance. Thus, it is difficult for the prior art to increase the relative corner illuminance without entailing ghost interference.

Although the ghost interference caused by the ghost light rays produced by the converging Fresnel lens 4 disposed behind the liquid crystal panel 3 as shown in FIG. 1a is conspicuous, the ghost light rays produced by the Fresnel collimator lens 2 disposed before the liquid crystal panel 3 do not cause problems because the ghost light rays travel outside the field of view of the projection lens 5.

As is apparent from the foregoing description, it is difficult for the prior art to prevent the reduction of light capturing efficiency or undesirable ghost interference and, at the same time, to enhance relative corner illuminance.

SUMMARY OF THE INVENTION

Accordingly, it is an object of the present invention to provide a liquid crystal projection display capable of enhancing relative corner illuminance without reducing light capturing efficiency.

Another object of the present invention is to provide a liquid crystal projection display capable of eliminating adverse effects of the reduction of light capturing efficiency of a projection optical system capable of projecting light rays so that relative corner illuminance is improved and ghost interference is reduced and of displaying an image of a satisfactory quality.

A third object of the present invention is to provide a means for reducing the adverse effect of moirë produced by the interference between the arrangement of pixels of a liquid crystal panel included in an optical system capable of projecting light rays so that relative corner illuminance is improved, and a lenticular lens provided on a screen.

A fourth object of the present invention is to provide a means for reducing differences in brightness and in whiteness between the displays of a multiscreen display employing an optical system capable of projecting light rays so that relative corner illuminance is improved.

BRIEF DESCRIPTION OF THE DRAWINGS

The above and other objects, features and advantages of the present invention will become more apparent from the following description taken in connection with the accompanying drawings, in which:

Figs. 1b and 1b are plan views of pixels of the prior art liquid crystal projection display of FIG. 1a;

FIGS. 22a and 22b are schematic sectional views, respectively, of a liquid crystal projection display in a sixteenth embodiment according to the present invention;

DESCRIPTION OF THE PREFERRED EMBODIMENTS

To achieve the objects of the invention, the present invention employs the following means.

An optical system according to the present invention on the entrance side of a liquid crystal panel is provided with a relative illuminance enhancing means for enhancing illuminance in the corners of the screen of the liquid crystal panel (First to eighth embodiments).

An optical system according to the present invention disposed on the exit side of a liquid crystal panel is provided with a ghost interference reducing means (Ninth, tenth and thirteenth embodiments).

An optical system according to the present invention disposed on the exit side of a liquid crystal panel is provided with a lenticular lens means for reducing moiré interference (Fourteenth and fifteenth embodiments).

A liquid crystal projection display is provided with a vertical directivity controlling lenticular lens means (nineteenth embodiment).

An optical system according to the present invention disposed on the exit side of a liquid crystal panel is provided with a transmissivity detecting and controlling means for detecting and controlling the transmissivity of the liquid crystal panel (Twentieth embodiment).

The Relative illuminance enhancing means reduces the illuminance in the central region of the screen of the liquid crystal panel and increases the illuminance in the corners of the screen of the liquid crystal panel to improve the relative corner illuminance without reducing light capturing efficiency.

The ghost interference reducing means reduces the reflectivity of the surface with ghost light rays (Ninth and tenth embodiments) or makes ghost light rays diverge to reduce the undesirable effect of ghost light rays (Thirteenth embodiment).

The lenticular lens means blurs the arrangement of pixels forming an image on a screen (Fourteenth embodiment).

The transmissivity detecting and controlling means detects the transmissivity of the liquid crystal panel corresponding to a black level signal and a white level signal, and controls the transmissivity so as not to deviate from a fixed value.

The vertical directivity controlling lenticular lens means compensates chromatic aberration attributable to the Fresnel lens to reduce tone deviation.

Figure 4:
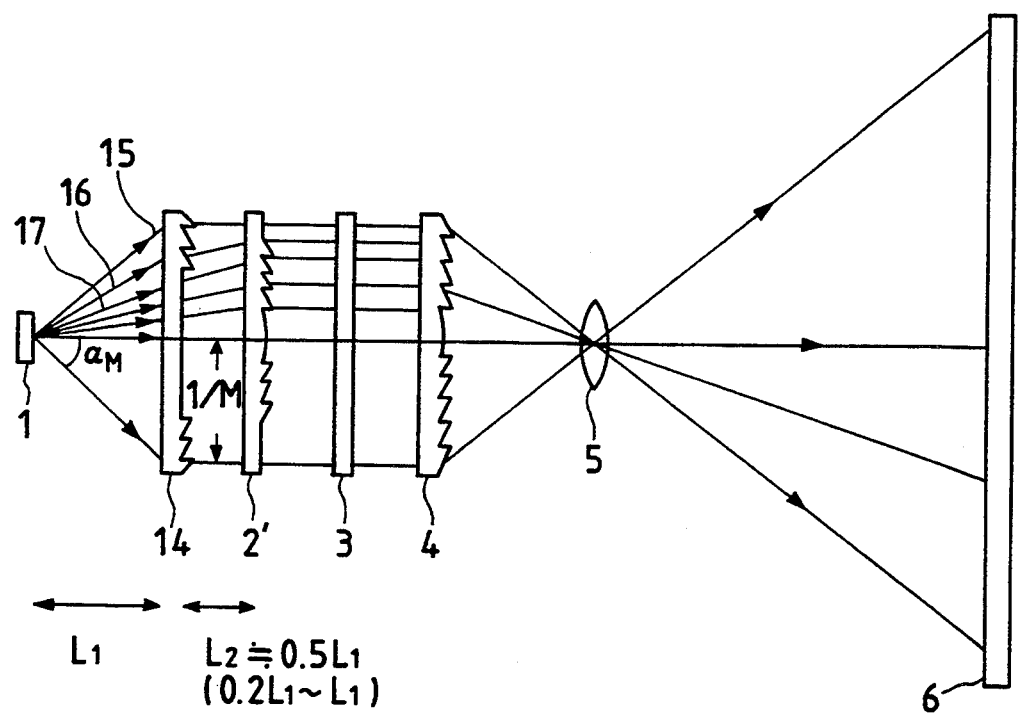
FIG. 4 is a schematic sectional view of a liquid crystal projection display in a first embodiment according to the present invention.

First Embodiment (FIG. 4)

Figure 1A:
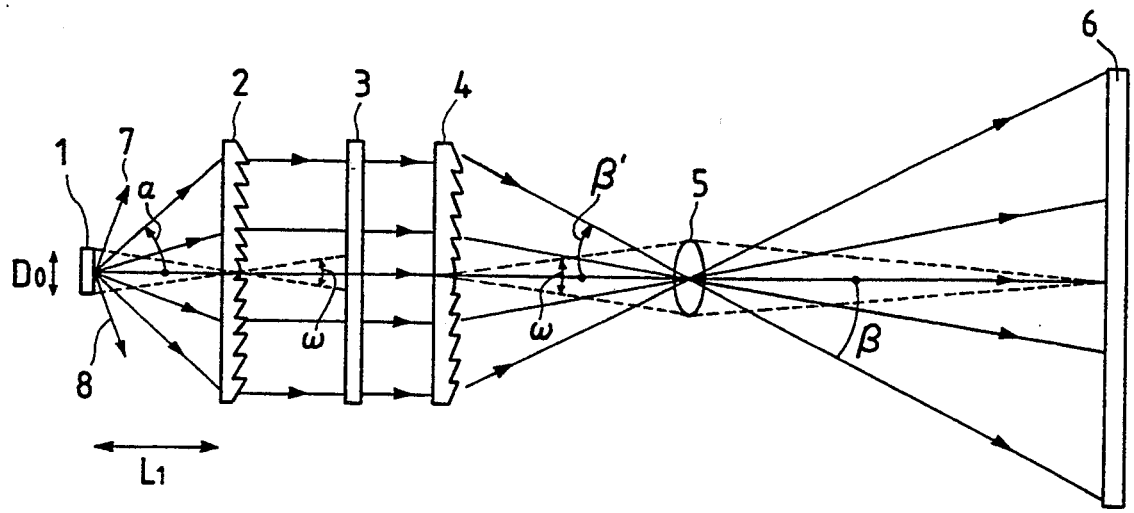
FIG. 1a is a schematic sectional view of a prior art liquid crystal projection display.
Figure 1B:
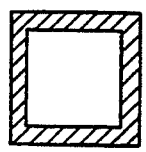
Figure 1C:
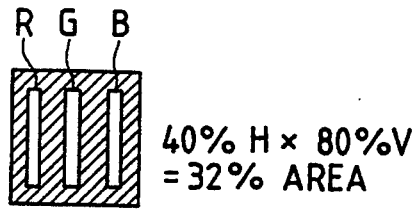

A liquid crystal projection display in a first embodiment according to the present invention will be described hereinafter with reference to FIG. 4, in which parts like or corresponding to those shown in FIG. 1a are designated by the same reference numerals and the description thereof will be omitted. Referring to FIG. 4, the liquid crystal projection display is provided with a relative illuminance enhancing means included in an optical system on the entrance side of the liquid crystal panel 3 and comprising Fresnel lenses 14 and 2' arranged in that order with respect to the direction of travel of light rays between the surface light source 1 and the liquid crystal panel 3. Outer light rays 15, middle light rays 16 and inner light rays 17 fall in the peripheral region, the middle region and the central region, respectively, of the Fresnel lens 14. The peripheral region of the Fresnel lens 14 has a maximum power (a minimum focal length), the middle region of the same has a middle power, and the central region of the same has a minimum power; that is, the Fresnel lens 14 is formed in a profile that makes light rays fall on the entrance surface of the Fresnel lens 2' in a substantially uniform illuminance distribution. The Fresnel lens 2' is formed in a profile that makes the outgoing light rays travel substantially in parallel the optical axis of the liquid crystal panel 3. Thus, the Fresnel lens 14 nearer to the surface light source 1 than the Fresnel lens 2' is formed so that the peripheral region thereof has the highest light converging ability, and the Fresnel lens 2' nearer to the liquid crystal panel 3 than the Fresnel lens 14 is formed so that the central region thereof has the highest light converging ability. In a modification, the Fresnel lens 14 may be substituted by a toroidal lens of an outside diameter equal to the diameter of the Fresnel lens 14, and the Fresnel lens 2' may be substituted by a circular lens of a diameter equal to the outside diameter of the middle region of the Fresnel lens 2'.

Thus, the Fresnel lenses 14 and 2' make light rays fall on the entrance surface of the liquid crystal panel 3 in a uniform illuminance distribution, because the illuminance in the central region of the liquid crystal panel 3 is lower than that in the central region of the liquid crystal panel of the prior art liquid crystal projection display, and the illuminance in the peripheral region of the liquid crystal panel 3 is higher than that in the peripheral region of the liquid crystal panel of the prior art liquid crystal projection display. Thus, the relative corner illuminance, namely, the ratio of the illuminance in the peripheral region of the liquid crystal panel to that in the central region of the same, can be improved without reducing light capturing efficiency.

A method of designing the Fresnel lenses 14 and 2' for making illuminance distribution on the entrance surface of the liquid crystal panel 3 uniform will be explained with reference to FIG. 5.

The prism angle $\theta$ of a Fresnel lens is calculated by using formulas (1) and (2).

$$\tan \theta = \frac{\sin \alpha - \sin \gamma}{n \cdot \sin \left( \cos^{-1} \frac{\sin \alpha}{n} - \right) \cos \gamma} \quad (1)$$

$$\tan \gamma = \frac{y_M \cdot \sin \alpha - y}{L_2 \cdot \sin \alpha_M} \quad (2)$$

where $\alpha$ is incidence angle, y is outgoing angle, and $\gamma$ is the refractive index of the material forming the Fresnel lens.

Figure 5:
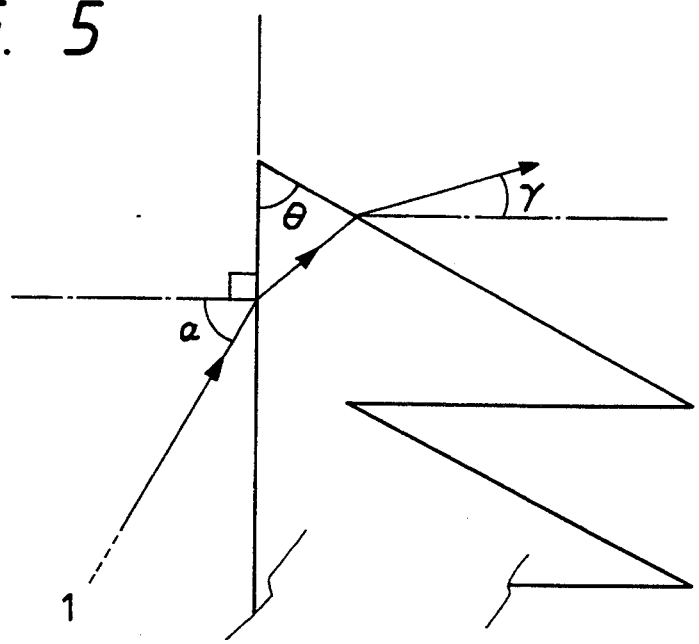
FIG. 5 is a diagrammatic view of assistance in explaining the principle on which the first embodiment is based.

As shown in FIG. 5, with the Fresnel lens 14 of the first embodiment shown in FIG. 4, the incidence angle $\alpha$ is equal to the inclination $\alpha$ of the light rays emitted by the light source. The outgoing angle $\gamma$ can be calculated by using the formula (2). In the formula (2), $L_2$ is the distance between the lenses 14 and 2', $\alpha_M$ is a maximum incidence angle on the Fresnel lens 14' $y_M$ is the radius of the Fresnel lens 2', and y is the vertical distance between the center of the Fresnel lens 14 and a point of incidence of light rays on the Fresnel lens 14.

Referring to FIG. 5, with the Fresnel lens 2', the outgoing angle $\gamma$ is approximately equal to 0°, and the incidence angle is equal to the outgoing angle $\gamma$ of light rays leaving the Fresnel lens 14. The prism angle $\theta$ of the Fresnel lens 2' also can be calculated by using the formulas (1) and (2). The Fresnel lenses 14 and 2' thus designed make the illuminance distribution on the liquid crystal panel 3 uniform.

It is noted that the Fresnel lenses 14 and 2' need not necessarily be designed by using the formulas (1) and (2). The Fresnel lens 2' of the optical system on the entrance side of the liquid panel, disposed nearer to the liquid crystal panel 3 and having a central region having a power higher than that of the peripheral region of the same, and the Fresnel lens 14 of the same optical system, disposed nearer to the light source 1 and having a peripheral region having a power higher than that of the central region of the same are the constituent features of the first embodiment of the present invention.

Second Embodiment

Figure 6A:
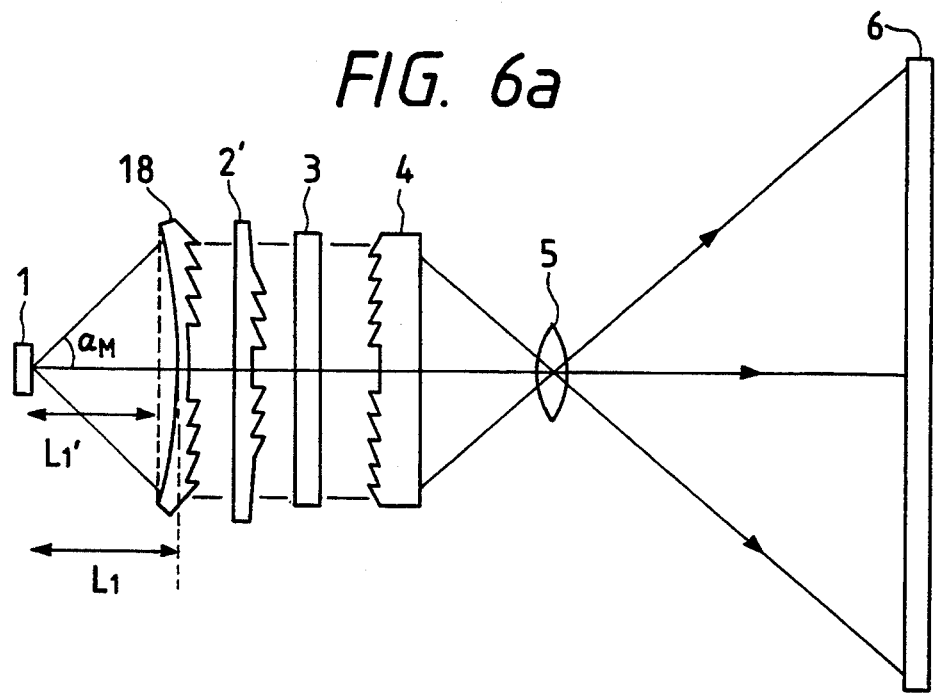
FIGS. 6a and 6b are a schematic sectional view of a liquid crystal projection display in a second embodiment according to the present invention and a plan view of assistance in explaining a method of forming a Fresnel lens having a spherical surface, respectively.

A liquid crystal projection display in a second embodiment according to the present invention will be described with reference to FIGS. 6a and 6b, in which parts like or corresponding to those of the first embodiment are designated by the same reference numerals and the description thereof will be omitted.

The second embodiment employs a converging Fresnel lens 18 having a spherical or cylindrical entrance surface convex toward the light source 1 instead of the Fresnel lens 2 of the prior art liquid crystal projection display shown in FIG. 1a, having a flat entrance surface.

In the prior art liquid crystal projection display, the light capturing efficiency was about 50% and the relative corner illuminance was 25% when the maximum incidence angle $a_M$ on the entrance surface of the converging Fresnel lens 2 was $\pi/4$ rad.

In the second embodiment, the relative corner illuminance can be increased beyond 25% when $a_M = \pi/4$ rad without reducing the light capturing efficiency below about 50%. For example, when $L_1/L_1' = 1.1$ in the arrangement of FIG. 6a, the illuminance in the central region of the liquid crystal panel 3 is about 1/1.21 times the illuminance in the same region when the converging Fresnel lens 2 of FIG. 1a is used, and the illuminance in the peripheral region of the liquid crystal panel 3 is about 1.2 times the illuminance in the same region when the converging Fresnel lens 2 of FIG. 1a is used. Accordingly, the relative corner illuminance of the liquid crystal panel 3 is about 1.4 times ($1.2 \times 1.2$) the relative corner illuminance of the same when the converging Fresnel lens 2 of FIG. 1a is used.

Figure 6B:
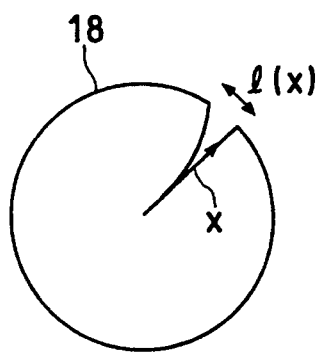

FIG. 6b shows a method of forming the Fresnel lens 18 having a concave entrance surface from a Fresnel lens having a flat entrance surface. In FIG. 6b, x is the distance between a point on a radius and the center, l(x) is the width of a sectorial region to be cut off at the point at the distance x from the center, and R is the radius of curvature of the concave surface of the Fresnel lens 18. After cutting off the sectorial region, the edges of the cut are joined together adhesively to obtain the Fresnel lens 18 having a concave entrance surface.

$$l(x) = 2\pi x^3 / 6R^2 \quad (3)$$

When $x = 100$ mm, $R = 300$ mm, $l(x) \approx 23$ mm.

The factor $x^3/6R^2$ is approximated through the Taylor expansion of $x/R - \sin(x/R)$.

The constituent feature of the second embodiment is the optical system on the entrance side of the liquid crystal, provided with the converging Fresnel lens having a concave entrance surface concave toward the light source.

Third Embodiment

A liquid crystal projection display in a third embodiment according to the present invention will be described hereinafter with reference to FIG. 7a, in which parts like or corresponding to those shown in FIG. 4 are designated by the same reference numerals and the description thereof will be omitted.

Figure 7A:
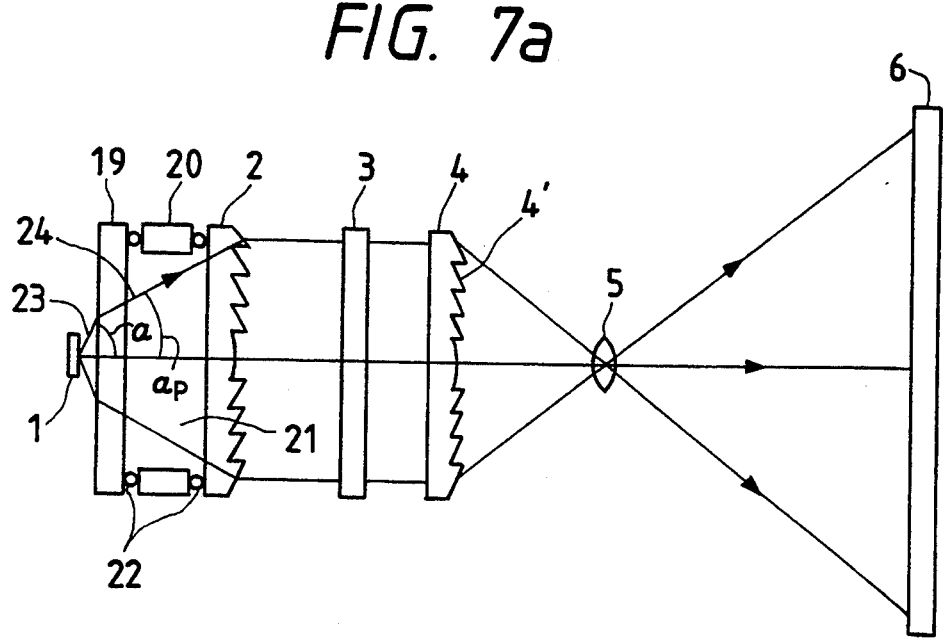
FIGS. 7a, 7b and 7c are a schematic sectional view of a liquid crystal projection display in a third embodiment according to the present invention, and graphs of assistance in explaining the principle on which the third embodiment is based.

Shown in FIG. 7a are a transparent plate 19, a vessel 20 having the shape of a circular cylinder or a square cylinder, a Fresnel lens 2, a transparent liquid 21 contained in the vessel 20, and O rings 22 for sealing the vessel 20. The transparent liquid 21 is a liquid having a refractive index nearly equal to those of the transparent plate 19 and the Fresnel lens 2 and having a comparatively low vapor pressure, such as silicone oil, ethylene glycol or glycerol.

Figure 7B:
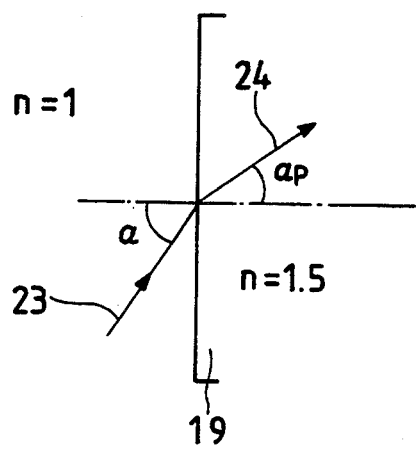

The principle on which the third embodiment functions will be described with reference to FIGS. 7b and 7c. Referring to FIG. 7b, the relation between the incidence angle $a$ at which the light rays traveling through air arrive at the transparent plate 19, and the angle $a_p$ of refraction is expressed by the following expression.

$$\sin a = n \cdot \sin a_p \quad (4)$$

Since $a \leq 90°$, when $n = 1.5$, $$a_p \leq \sin^{-1}(1/1.5) = 42° \quad (5)$$

Figure 2A:
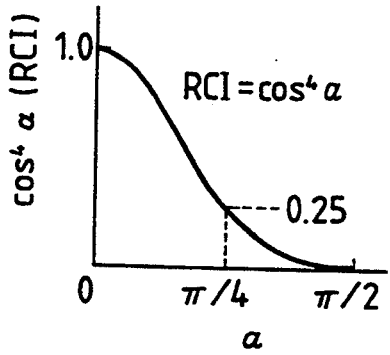
FIGS. 2a and 2b are graphs of assistance in explaining problems in the prior art.
Figure 2B:
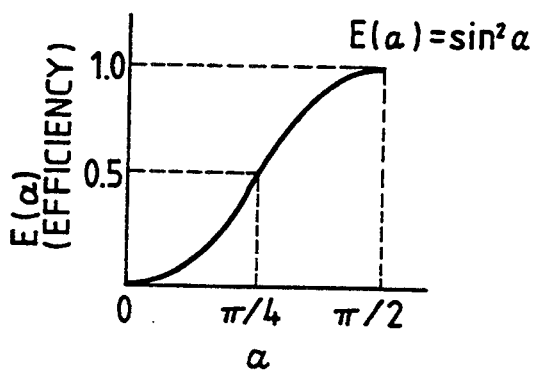
Figure 7C:
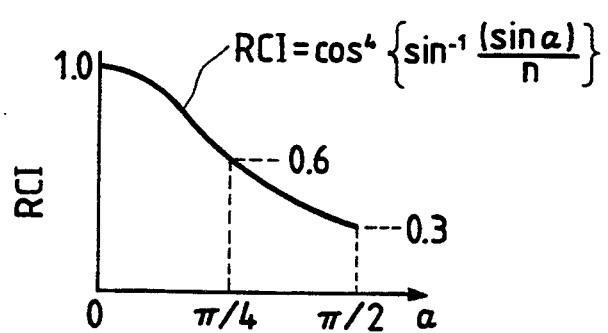

As is obvious from the comparison of FIGS. 7c and 2a, the relative corner illuminance of the third embodiment is far greater than that of the prior art. For example, when the incidence angle $a = \pi/4$ rad (45°), RCI=0.6 for the third embodiment whereas RCI=0.25 for the prior art. Thus, the transparent liquid 21 sealed in the vessel 20 improves the relative corner illuminance remarkably.

The constituent feature of the third embodiment is the transparent liquid 21 for the enhancement of illuminance in the peripheral region of the liquid crystal panel 3.

The cooling effect of the convection of the transparent liquid 21 is the secondary effect of the transparent liquid 21. The cooling effect of the transparent liquid enables the use of a more intense light source than that of the prior art liquid crystal projection display, so that the liquid crystal projection display in the third embodiment displays images brighter than those displayed on the prior art liquid crystal projection display.

The prism angle of the Fresnel lens 2 may be determined through calculation using the formulas (1) and (2).

Fourth Embodiment

Figure 8A:
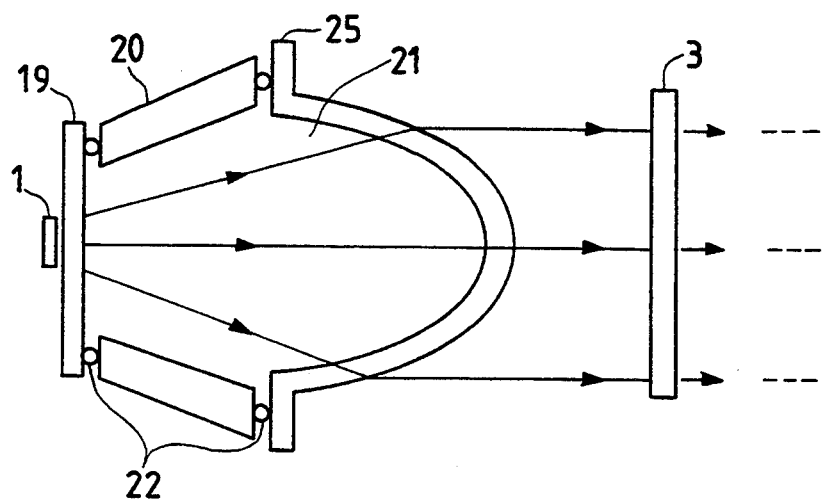
FIGS. 8a and 8b are schematic sectional views of a liquid crystal projection display in a fourth embodiment according to the present invention.

Referring to FIG. 8a, the fourth embodiment employs, instead of the Fresnel lens 2 of the third embodiment, an ellipsoidal lens 25 having an eccentricity approximately equal to the reciprocal of the refractive index of a transparent liquid 21 sealed in a space defined by a transparent plate 19, a vessel 20 and the lens 25. A light source 1 is disposed at the remote focus of the ellipsoidal surface of the ellipsoidal lens 25 so that the ellipsoidal lens 25 is able to collimate the incident light rays.

The relative corner illuminance on the liquid crystal panel 3 of the fourth embodiment is higher than that shown in FIG. 7c on the liquid crystal panel 3 of the third embodiment.

Figure 8B:
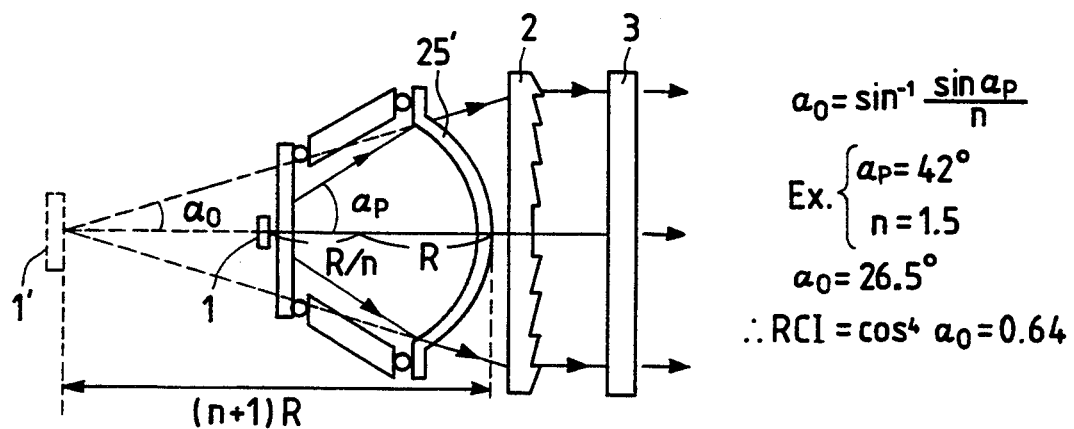

FIG. 8b shows a modification of the fourth embodiment. This modification employs a spherical lens 25' and a Fresnel lens 2 instead of the ellipsoidal lens 25. In this modification, RCI≈0.64. This modification uses the principle of aplanatic point of optics. For the further detail of the principle of aplanatic point, refer to U.S. Pat. No. 4,576,442 which corresponds to Japanese Patent Laid-open No. 59-142513 (Japanese Patent Application No. 58-16156 filed by the applicant of the present patent application).

Fifth Embodiment

Figure 9:
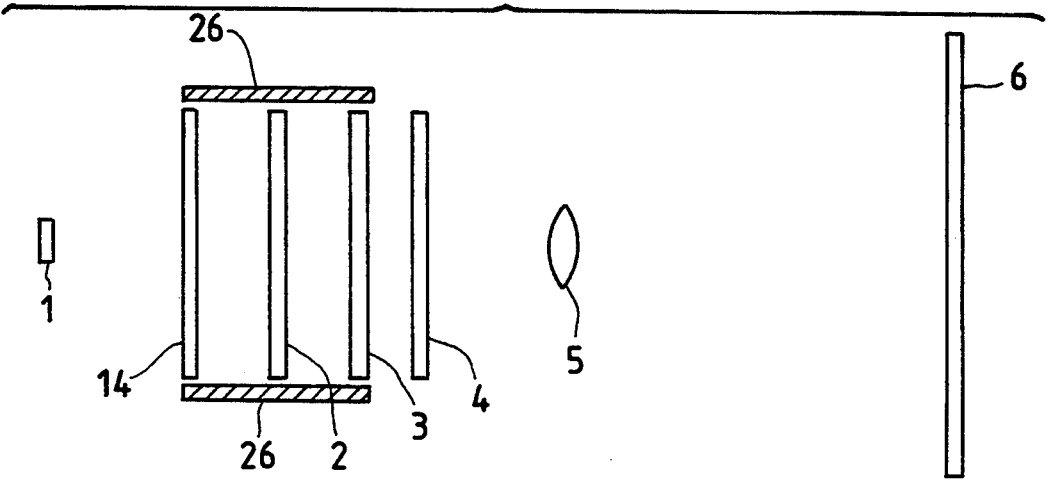
FIG. 9 is a sectional view of a liquid crystal projection display in a fifth embodiment according to the present invention.

A liquid crystal projection display in a fifth embodiment according to the present invention is shown in FIG. 9, in which parts like or corresponding to those of the first embodiment shown in FIG. 4 are designated by the same reference numerals and the description thereof will be omitted. The fifth embodiment comprises, in addition to the components of the first embodiment shown in FIG. 4, mirrors 26 for preventing the unnecessary scattering of light rays. The second, third and fourth embodiments may be provided with the mirrors 26.

FIGS. 12a, 12b, 13 and 14 show different light sources.

Sixth Embodiment

Figure 10A:
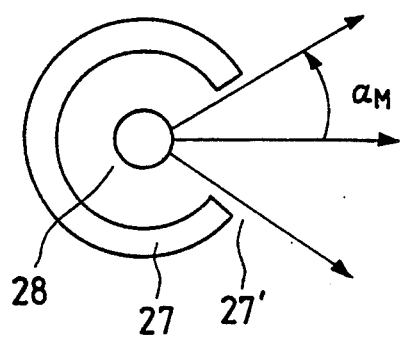
FIGS. 10a and 10b are views of assistance in explaining a sixth embodiment of the present invention.

A liquid crystal projection display in a sixth embodiment according to the present invention will be described with reference to FIGS. 10a and 10b. A cylindrical light source 28 is disposed with its longer side extending along a horizontal direction, i.e., the direction of the wider angle of directivity of the liquid crystal panel, and its shorter side extending along a vertical direction, i.e., the direction of the narrower angle. The light source may be a metal halide lamp, halogen lamp or a xenon lamp. A cylindrical or elliptic mirror 27 is disposed with its longer side extended along a horizontal direction, i.e., the direction of the wider angle of directivity of the liquid crystal panel, and its shorter side extended along a vertical direction, i.e., the direction of the narrower angle.

Figure 10B:
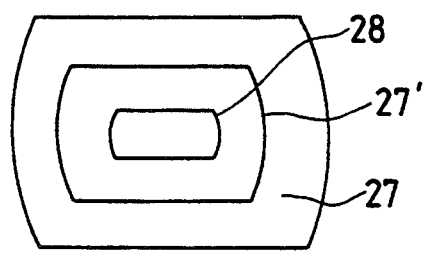

As shown in FIG. 10b, the mirror 27 has an opening 27' having a longer side extended along a horizontal direction and a shorter side extended along a vertical direction. Thus, unnecessary diffusion of light rays through the opening 27' can be prevented. The maximum angle $\alpha_M$ of direction of travel of light rays traveling through the opening 27' to the optical axis of the liquid crystal panel is limited to, for example, about 30° or below to enhance the relative corner illuminance. Since the angle $\omega$, which has been described with reference to FIG. 1a, of divergence of light rays transmitted through the liquid crystal panel with respect to the direction of the narrower angle is narrower than that with respect to the direction of the wider angle of the liquid crystal panel, the loss of light can be suppressed to the least extent to prevent the reduction of contrast.

The constituent features of the sixth embodiment is disposing the light source with its longer side extended along the direction of the wider angle of directivity of the liquid crystal panel and its shorter side extended along the direction of the narrower angle.

Seventh Embodiment

Figure 11A:
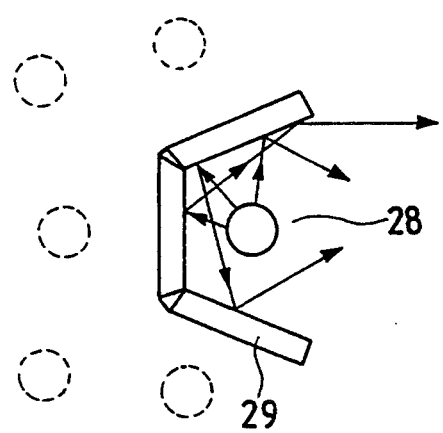
FIGS. 11a, 11b, 11c and 11d are views of assistance in explaining a seventh embodiment of the present invention.
Figure 11B:
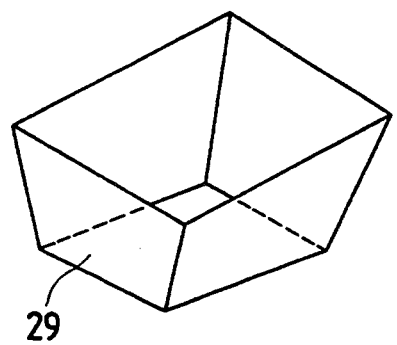

A liquid crystal projection display in a seventh embodiment according to the present invention and modifications thereof are shown in FIGS. 11a to 11d. Shown in FIG. 11a is a polyhedral mirror 29 and a light source 28, such as a point light source or a cylindrical light source. FIG. 11b is a perspective view of the mirror 29. In FIG. 11a, dotted circles are virtual images of the point light source 28 formed by the mirror 29. Thus the mirror 29 forms a plurality of virtual images of the light source.

Figure 11C:
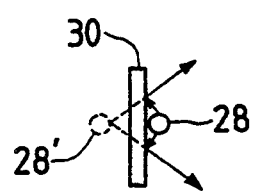

Shown in FIG. 11c are a flat mirror 30 and a light source 28, such as a point light source or a cylindrical light source. The flat mirror 30 forms one virtual light source 28'.

Figure 11D:
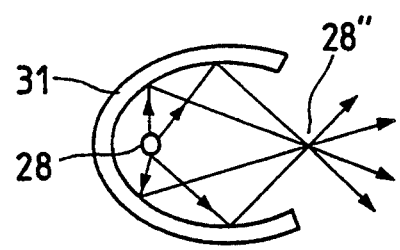

Referring to FIG. 11d, a point light source 28 is disposed at one of the foci of an elliptic mirror 31 to form a real image 28" at the other focus of the elliptic mirror 31. The arrangements shown in FIGS. 11a to 11d may be used instead of the surface light source 1 employed in the first to fifth embodiments.

Eighth Embodiment

Figure 12A:
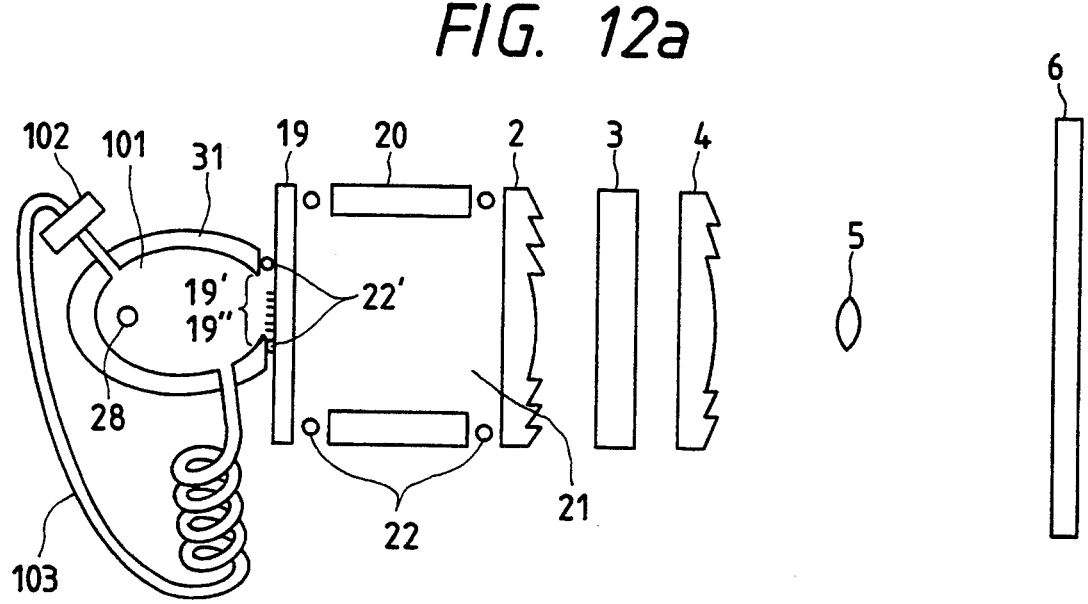
FIGS. 12a and 12b are views of assistance in explaining an eighth embodiment of the present invention.

A liquid crystal projection display in an eighth embodiment according to the present invention is shown in FIG. 12a. The eighth embodiment is similar in construction to the third embodiment, except that the eighth embodiment employs the light source unit shown in FIG. 11d instead of the surface light source 1 of FIG. 7a. In FIG. 12a, indicated at 101 is a heat transfer medium, such as air or a liquid, at 22' are sealing members, at 102 is a motor-driven miniature pump and at 103 is a tube. The miniature pump 102 circulates the heat transfer medium 101 through a space defined by the elliptic mirror 31 to cool the light source 28. As shown in FIG. 12a, a diffraction grating 19' is provided on the entrance surface of a transparent plate 19, and a Faraday element 19" turns the plane of polarization of light through an angle of 45° C.

Figure 12B:
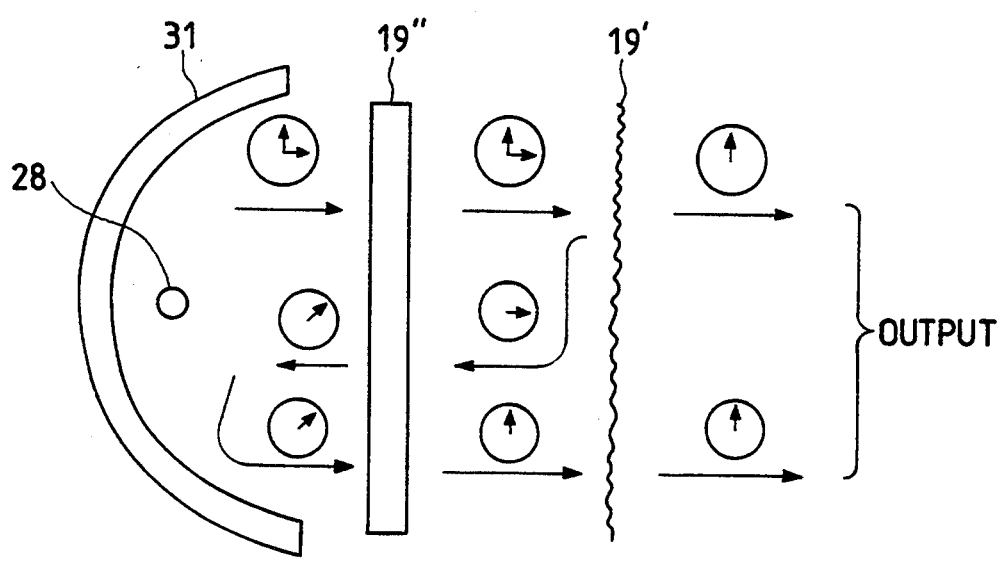

The actions of the diffraction grating 19' and the Faraday element 19" will be described with reference to FIGS. 12b, in which arrows enclosed by circles indicate the directions of polarization of light, respectively. Light rays reflected by the mirror 31 undergo the magnetooptic effect of the Faraday element 19" and diffracted by the diffraction grating 19', and then only longitudinally polarized light rays fall on the transparent plate 19. The laterally polarized light rays are reflected toward the Faraday element 19", turned through an angle of 45° and become longitudinally polarized light rays. Then, the longitudinally polarized light rays travels through the diffraction grating 19'.

As is generally known, the common liquid crystal display panel of the TN system needs polarizing plates on its on the opposite sides thereof. Accordingly, an energy loss of 50% occurs unavoidably. Since the eighth embodiment shown in FIG. 12a is not provided any polarizing plate on its entrance side, the energy loss is reduced.

Ninth Embodiment

Figure 3A:
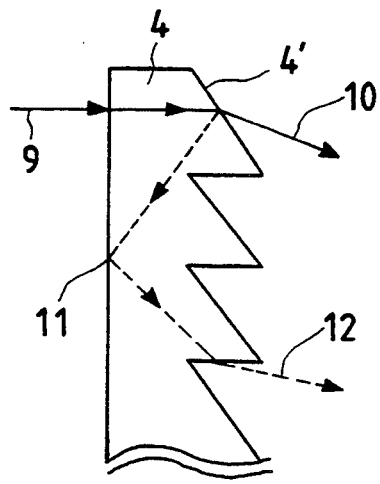
FIGS. 3a and 3b are fragmentary sectional views of a converging Fresnel lens, of assistance in explaining problems in the prior art.
Figure 3B:
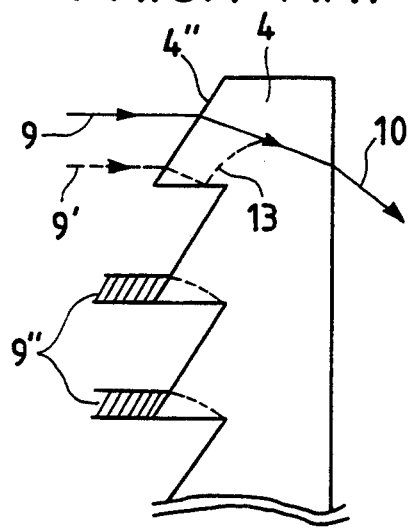
Figure 13:
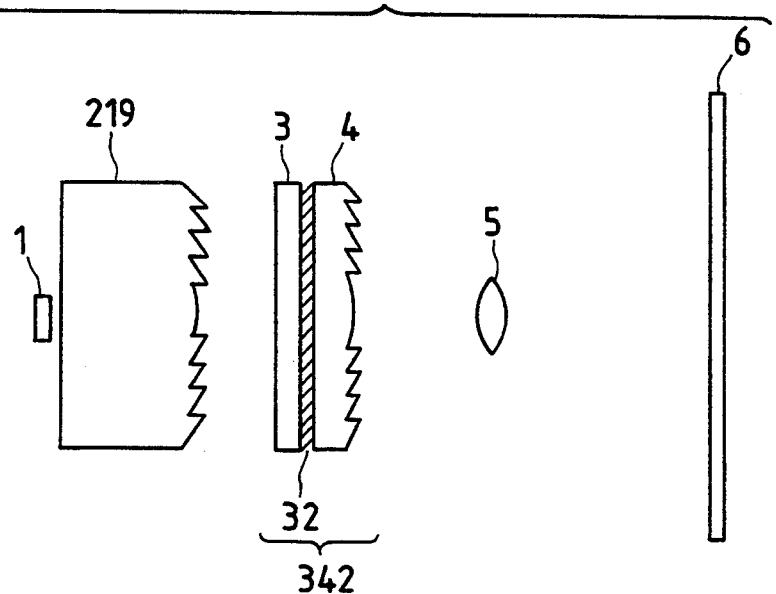
FIG. 13 is a schematic sectional view of a liquid crystal projection display in a ninth embodiment according to the present invention.

A liquid crystal projection display in a ninth embodiment according to the present invention shown in FIG. 13 incorporates a ghost interference eliminating means. Shown in FIG. 13 are a light source 1, a liquid lens 219 consisting of a Fresnel collimator lens 2 and a transparent plate 19, a liquid crystal panel, a converging Fresnel lens 4, a projection lens 5 and a screen 6. Indicated at 32 is a transparent adhesive, such as an acrylic adhesive, having a refractive index nearly equal to about 1.5, which is the refractive index of an acrylic resin forming the Fresnel lens 4. Accordingly, light rays will not be reflected by the interface between the adhesive 32 and the Fresnel lens 4, so that the undesirable ghost light rays, which has been previously described with reference to FIG. 3b, will not be produced. The constituent feature of the ninth embodiment is joining the Fresnel lens 4 to the exit surface of the liquid crystal panel 3 with the adhesive having a refractive index in the range of 1.4 to 1.6.

Tenth Embodiment

Figure 14:
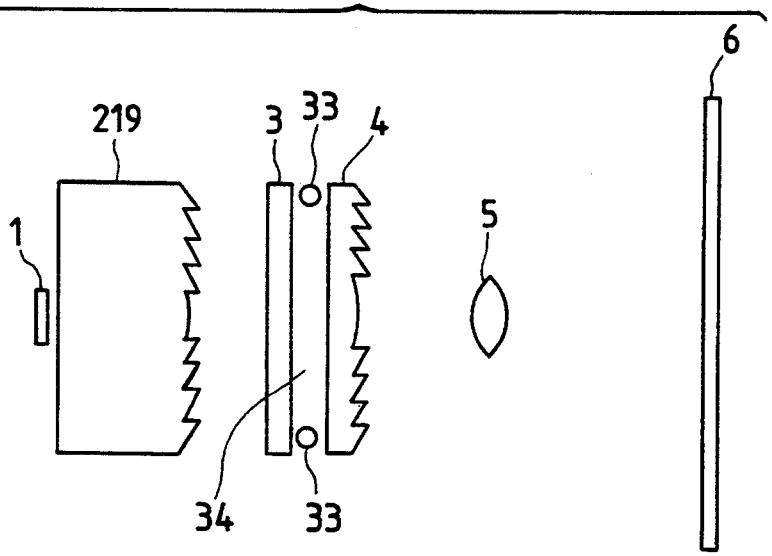
FIG. 14 is a schematic sectional view of a liquid crystal projection display in a tenth embodiment according to the present invention.

FIG. 14 shows a liquid crystal projection display in a tenth embodiment according to the present invention, which employs a liquid 34 having a refractive index in the range of 1.4 to 1.6, such as silicone oil, ethylene glycol or glycerol. The liquid 34 is sealed in a space formed between a liquid crystal panel 3 and a Fresnel lens 4 and sealed with a sealing member 33. The liquid eliminates ghost interference and cools the liquid crystal panel 3. In a modification, the liquid 34 may be sealed in a space formed on the entrance side of the liquid crystal panel 3.

The constituent feature of the tenth embodiment is sealing the liquid having a refractive index in the range of 1.4 to 1.6 in the space formed between the liquid crystal panel 3 and the Fresnel lens 4 disposed behind the liquid crystal panel 3 with respect to the direction of travel of light rays.

Eleventh Embodiment

Figure 15A:
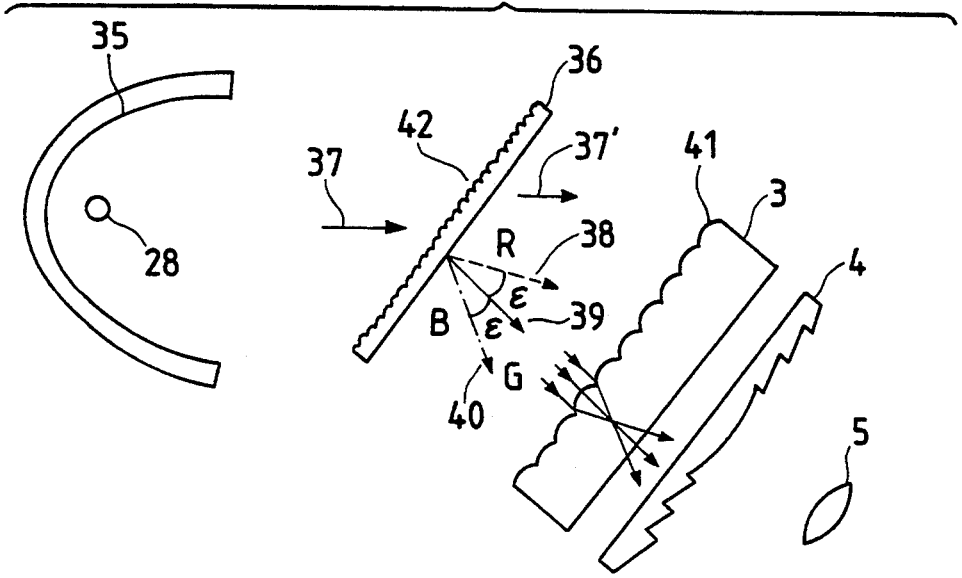
FIGS. 15a, 15c and 15b are views of assistance in explaining a liquid crystal projection display in an eleventh embodiment according to the present invention.
Figure 15B:
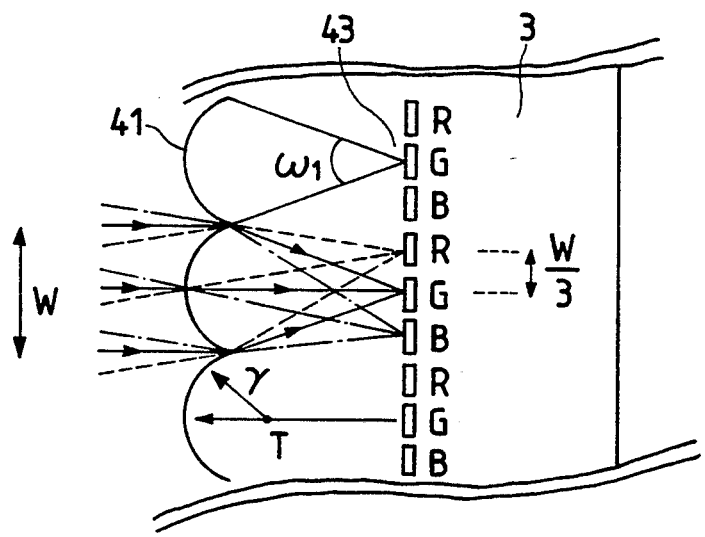
Figure 15C:
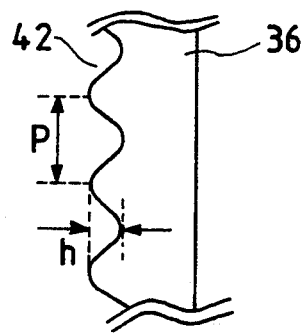

A liquid crystal projection display in an eleventh embodiment according to the present invention is shown in FIG. 15a, in which there are shown a point light source 28, a paraboloidal mirror 35, a diffraction plate 36 formed of a transparent plastic, a liquid crystal panel 3, lenticular lenses 41 forming the entrance surface of the liquid crystal panel 3, a Fresnel lens 4, and a projection lens 5. Light rays reflected by the paraboloidal mirror 35 are substantially parallel light rays. As shown in FIG. 15c, lenticular lenses 42 form the entrance surface of the diffraction plate 36. The lenticular lenses 42 are arranged at a pitch P slightly greater than the wavelength of the light rays and the height h of the lenticular lenses 42 is substantially equal to the wavelength of the light rays. The height h of the lenticular lenses 42 is determined so as to meet well known conditions for minimizing diffracted light 37' (FIG. 15a) of zero-th order. As is generally known, the conditions for minimizing diffracted light of zero-th order is substantially the same as those for maximizing diffracted light of first order. Diffracted light of first order travels in the direction of the arrow 39 (FIG. 15a). In FIG. 15a, the arrows 38, 39 and 40 indicate the directions of travel of red light rays R, green light rays G and blue light rays B, respectively. As shown in FIG. 15b, these light rays R, G and B are refracted by the lenticular lenses 41 forming the entrance surface of the liquid crystal panel 3. In FIG. 15b, dotted lines represent red light rays R, continuous lines represent green light rays G and alternate long and short dash line represent blue light rays B. The lenticular lenses 41 have the shape of an elliptic cylinder having an eccentricity approximately equal to the reciprocal of the refractive index of the material forming the lenticular lenses 41. Pixels are arranged at the foci of the lenticular lenses 41.

When conditions represented by the following expressions are met, the red light rays, R, the green light rays G and the blue light rays B fall on the red pixels R, green pixels G and blue pixels B of the liquid crystal panel 3.

$$r \simeq \frac{n-1}{n} T, \omega_1 = \frac{W}{T} \quad (6)$$

$$\frac{W}{3} \simeq \frac{T\epsilon}{n}, \omega_1 > \omega \quad (7)$$

$$\epsilon \simeq \frac{620 \text{ nm} - 520 \text{ nm}}{\sqrt{P^2 - \lambda^2}} \text{ rad} \quad (8)$$

where n is the refractive index of the material forming the lenticular lenses 41, T is the focal length of the lenticular lenses 41, r is the radius of curvature of the lenticular lenses 41, W is the pitch of the lenticular lenses 41, which is equal to the pitch of the pixel trios, $\omega_1$ is the convergence angle of light rays converged by the lenticular lenses 41 and $\omega$ is the divergence angle of light rays falling on the liquid crystal panel 3 (FIG. 4).

If T=1.1 mm, n=1.5 and $\epsilon$=0.14, from the expressions (6) and (7), r≃0.37 mm, W≃0.3 mm and $\omega_1$≃0.27 mm.

If P=900 nm and λ=570 nm, from the expression (8), $\epsilon$≃0.14 rad.

The loss of light energy at the liquid crystal panel 3 can be remarkably reduced. If the divergence angle (FIG. 1a) is 0.09 rad, the light transmissivity of the liquid crystal panel 3 is multiplied by about three times.

Twelfth Embodiment

Figure 16:
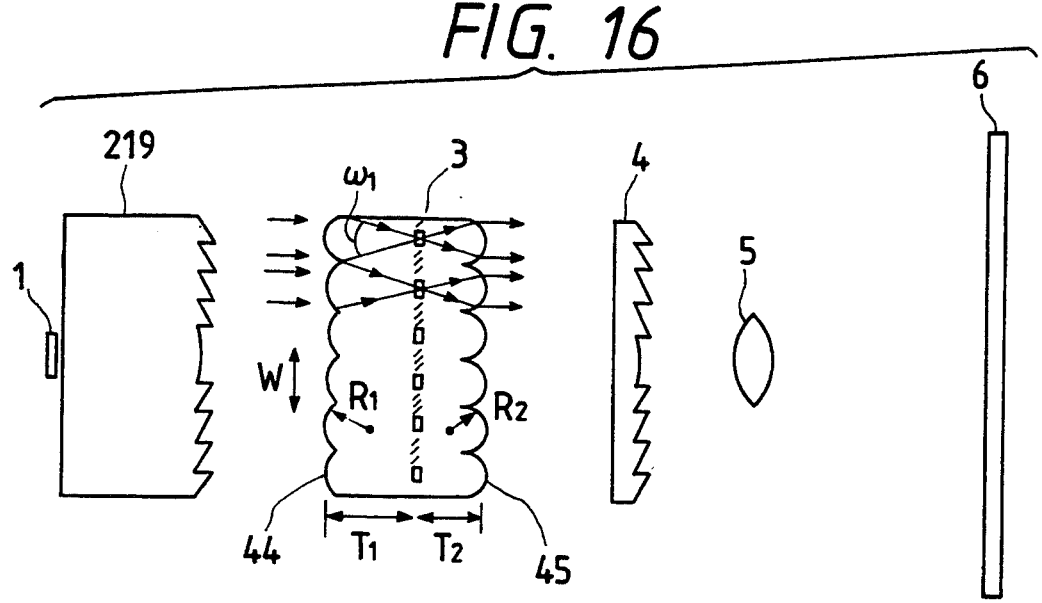
FIG. 16 is a schematic sectional view of a liquid crystal projection display in a twelfth embodiment according to the present invention.

A liquid crystal projection display in a twelfth embodiment according to the present invention is shown in FIG. 16, in which there are shown a light source 1, a liquid lens 219 consisting of a Fresnel lens 2 and a transparent plate 19, a Fresnel lens 4, a projection lens 5, a screen 6, lenticular lenses 44 forming the entrance surface of the liquid crystal panel 3, and lenticular lenses 45 forming the exit surface of the liquid crystal panel 3. The light transmissivity of the liquid crystal panel 3 can be improved when conditions represented by the following expressions are met.

$$R_1 = \frac{n-1}{n} T_1, R_2 \frac{n-1}{n} T_2, \quad (9)$$

$$\omega_1 \simeq \frac{W}{T_1} > \omega, T_2/T_1 = 0 \sim 1$$

If W=0.3 mm, n=1.5, $T_1$=1.1 mm, $\omega_1$=0.27 rad, $R_1$=0.37 mm and $T_2$=0.7 mm, $R_2$=0.23.

The lenticular lenses 45 forming the exit surface of the liquid crystal panel 3 cancel the divergence of light rays caused by the lenticular lenses 44 forming the entrance surface of the liquid crystal panel 3.

Thirteenth Embodiment

A liquid crystal projection display in a thirteenth embodiment according to the present invention incorporates a means for reducing the effect of ghost interference attributable to the Fresnel lens 4 in the eleventh and twelfth embodiment.

Figure 17A:
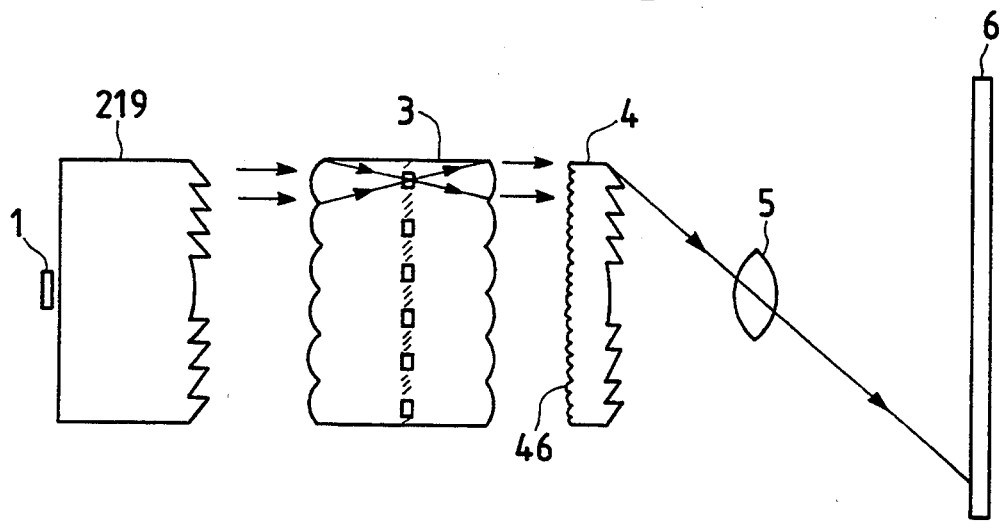
FIGS. 17a, 17b, 17c and 17d are views of assistance in explaining a liquid crystal projection display in a thirteenth embodiment according to the present invention.
Figure 17B:
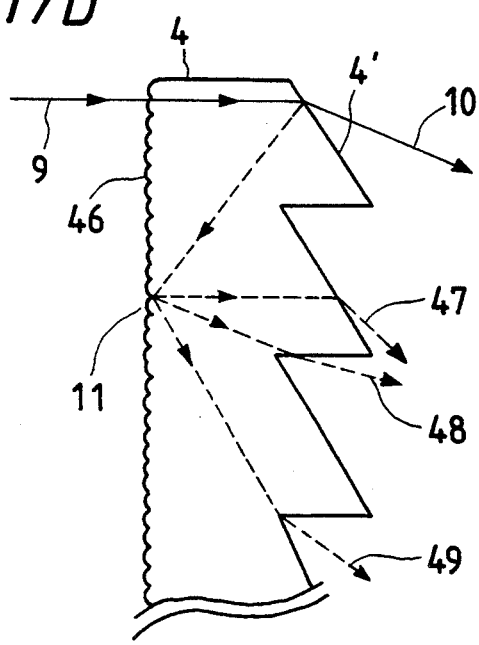

As shown in FIG. 17a, lenticular lenses are formed on the entrance surface of a Fresnel lens 4. Referring to FIG. 17b, incident light rays 9 are split into normal light rays 10 and ghost light rays by the Fresnel lens 4. The ghost light rays are scattered by the lenticular lenses 46 and leave the Fresnel lens 4 in directions 47, 48 and 49 as indicated by dotted lines, so that the effect of ghost interference of the ghost light rays is reduced, which will be understood from the comparison of the mode of travel of ghost light rays described with reference to FIG. 3a with the mode of travel of ghost light rays in this embodiment. As shown in FIG. 17c, the scattering angle of ghost light rays within the lenticular lenses 46 is twice the curving angle a, namely, an angle formed between tangents to each lenticular lens 46 at the opposite roots of the same (FIG. 17c). In FIG. 17c, indicated at 50 and 51 are incident ghost light rays and at 52 and 53 are scattered ghost light rays. The scattering angle 2a is multiplied by the refractive index n according to the Snell's law when the scattered light rays leave the Fresnel lens 4. The scattering angle 2a is 2n/(n−1) times the diverging angle (n−1)a of light rays refracted by the refractive power of the lenticular lens 46. If n=1.5, 2n/(n−1)=6. Thus, the scattering angle of ghost light rays scattered by reflection is as large as about six times the diverging angle of light rays caused to diverge by the refractive power of the lenticular lenses by scattering the light rays at a small diverging angle by refraction. Thus, ghost interference can be effectively reduced. The angle a must be 0.2 rad or below not to make the scattering angle of scattered light rays caused to scatter by refraction excessively large and must be 0.04 rad or above to make the scattering angle of light rays scattered by reflection sufficiently large (0.04≦a≦0.2).

Figure 17D:
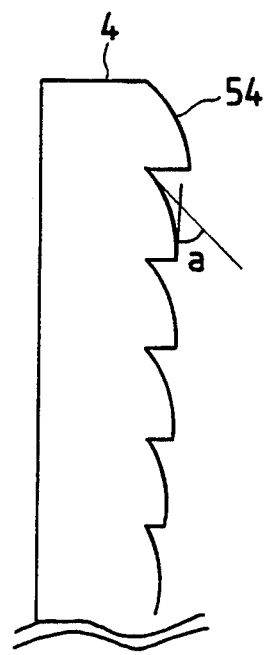
Figure 17C:
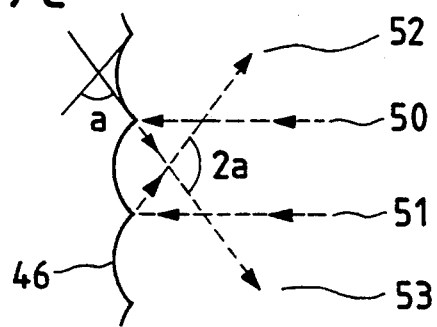

FIG. 17d shows a Fresnel lens 4 employed in a modification of the thirteenth embodiment. The exit surface 54 of this Fresnel lens 4 has the function of lenticular lenses. The exit surface 54 serves as Fresnel lenticular lenses for reducing ghost interference. As mentioned above, the curving angle a is in the range of 0.04 to 0.2.

Figure 18:
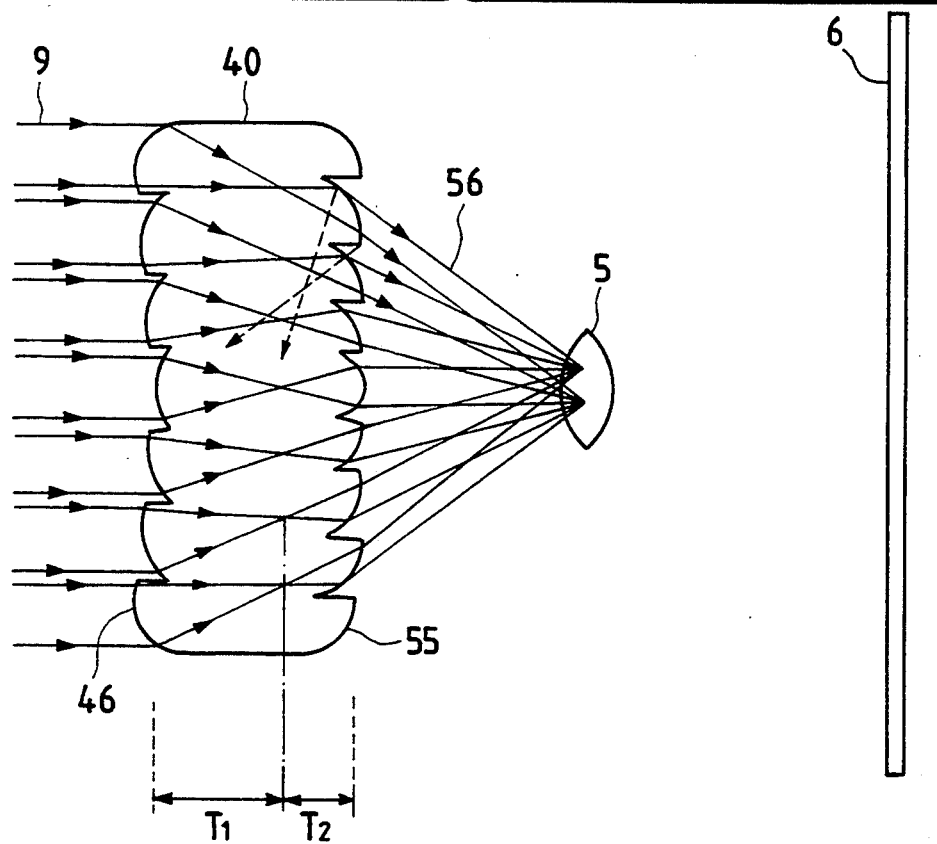
FIG. 18 is a diagrammatic view of a modification of the thirteenth embodiment.

FIG. 18 shows a double-sided composite Fresnel lens 40 employed in another modification of the thirteenth embodiment. In FIG. 18, there are shown also a projection lens 5, a screen 6, light rays 9 transmitted through a liquid crystal panel, a Fresnel entrance surface 46, a Fresnel exit surface 55 and outgoing light rays 56. The double-sided composite Fresnel lens 40 reduces ghost interference and reduces the diverging angle of refracted light rays.

Fourteenth Embodiment

Figure 19A:
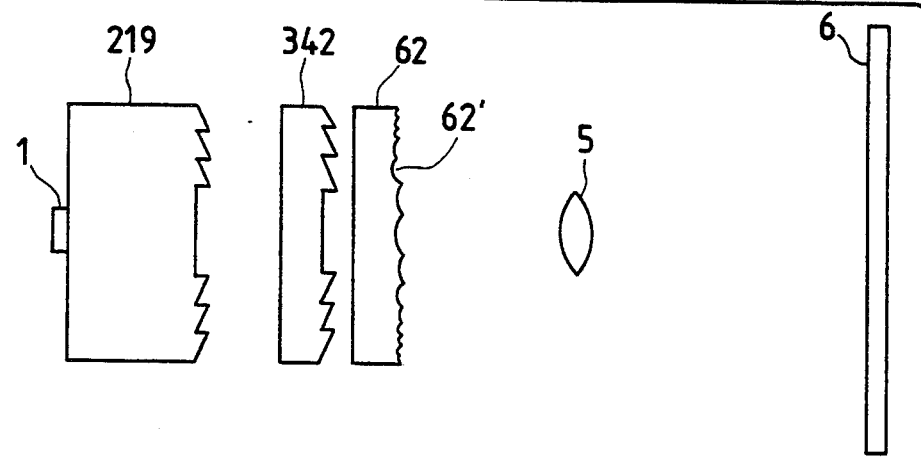
FIGS. 19a, 19b and 19c are views of assistance in explaining a liquid crystal projection display in a fourteenth embodiment according to the present invention.
Figure 19B:
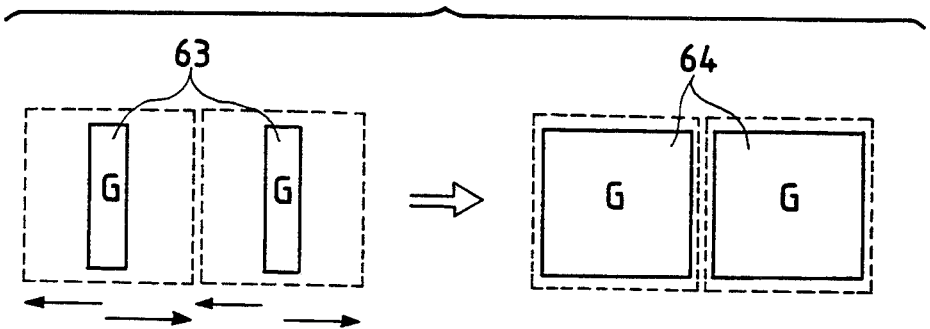

FIG. 19a shows a liquid crystal projection display in a fourteenth embodiment according to the present invention. The fourteenth embodiment incorporates a means for effectively reducing moiré interference and is featured by a lenticular plate 62 provided with lenticular lenses 62' on its exit surface. In FIG. 19a, there are shown a light source 1, a liquid lens 219 consisting of a Fresnel lens and a liquid, etc., as already mentioned for example in FIG. 7a, a composite liquid crystal panel 342 consisting of a liquid crystal panel, a Fresnel lens, and a transparent adhesive adhesively joining together the liquid crystal panel and the Fresnel lens as already mentioned in FIG. 13, a projection lens 5, and a screen 6. In FIG. 19b, indicated at 63 are green pixels having a width smaller than the pitch of the pixels, and at 64 are the images of the green pixels formed on the screen 6, having a width equal to the pitch of the pixels. Thus, the width of the pixels is enlarged on the screen 6 to the value corresponding to the pitch of the pixels on the principle as illustrated in FIG. 19c.

Figure 19C:
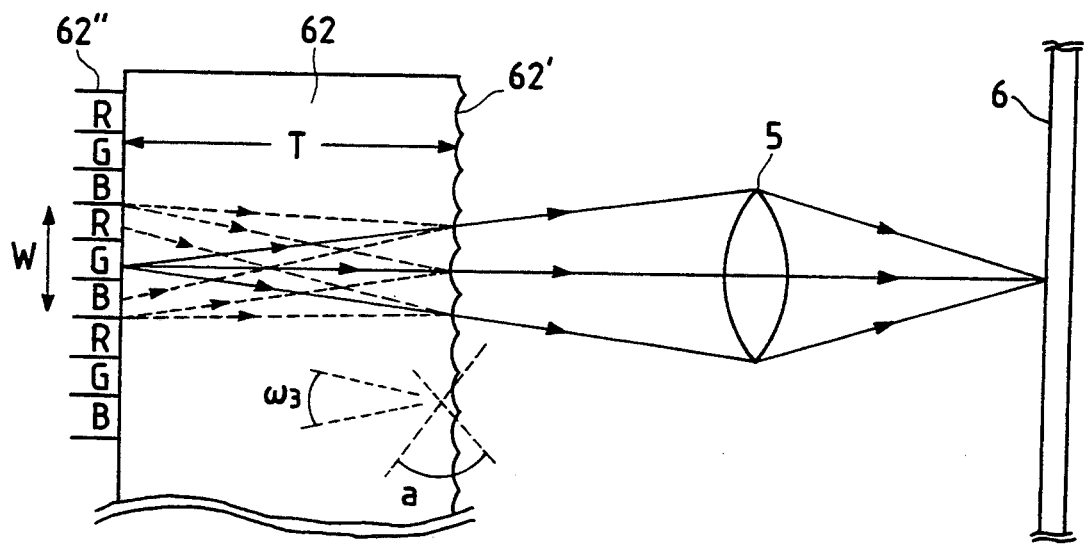

In FIG. 19c, indicated at 62" is a pixel arrangement equivalent to the arrangement of the pixels on the liquid crystal panel 3. In FIG. 19c lines are formed by tracking light rays in the reverse direction and show the width of an area on the liquid crystal panel 3 corresponding to the width of a dot on the screen 6. The width of a dot on the screen 6 is equal to the pitch W of the pixel trios when conditions represented by the following expression are met.

$$W \simeq \omega_3 \cdot T, \quad \omega_3 \simeq \frac{n-1}{n} a \qquad (10)$$

where T is the distance between the lenticular lenses 62' and the pixel surface of the liquid crystal panel 3, $\omega_3$ diverging angle within the lenticular lenses 62', a is the curving angle of the lenticular lenses 62' and n is the refractive index of the lenticular lenses 62'. When T=3 mm, W=0.3 mm and $\omega_3$=0.1 rad, the width of the pixels on the liquid crystal panel 3 is 0.3 mm. Accordingly, on the basis of the Snell's law, the curving angle a of the lenticular lenses 62' is 0.3 rad if the refractive index n=1.5.

Figure 20:
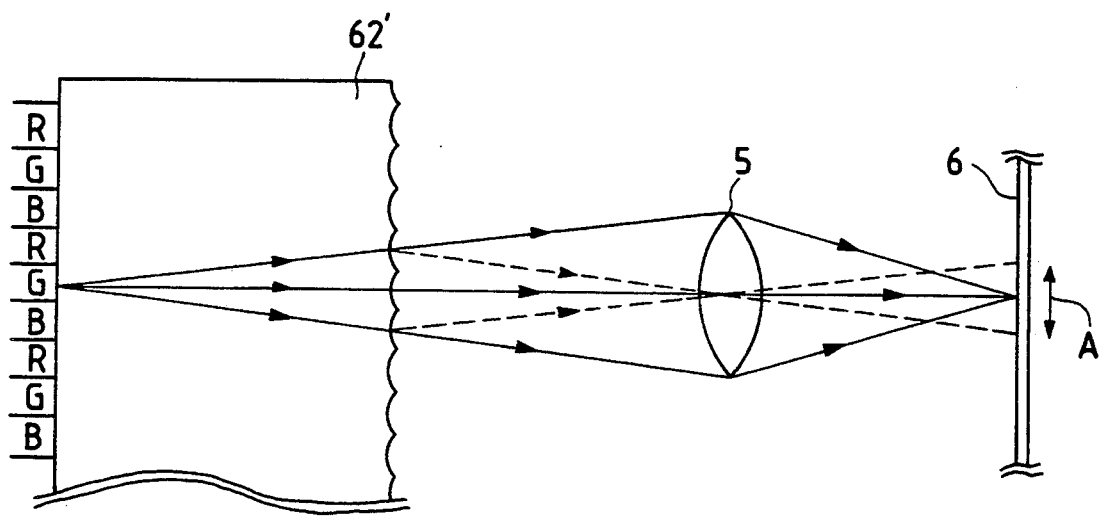
FIG. 20 is a view of assistance in explaining a liquid crystal display in a fourteenth embodiment according to the present invention.

FIG. 20 shows lines formed by tracking light rays traveling in the normal direction from a point on the liquid crystal panel 3 to the screen 6. In FIG. 20, A is the width of a pixel image on the screen 6. According to the reciprocity theorem (interchangeability of an object point and an image point) as applied to a common focusing optical system, A is approximately equal to the pitch of pixel images on the screen 6. Therefore, according to the principle of Fourier analysis, it is possible to make the arrangement of pixels invisible on the liquid crystal panel 3. Quantitatively, the transfer function of the lenticular lenses at the spatial frequency of the pixel trios is approximated by $\sin(\pi\omega_3 T/W) \cdot (W/\pi\omega_3 T)$. Accordingly, the value of the transfer function for the foregoing conditions is zero.

Thus, the fourteenth embodiment is able to eliminate the spatial frequency component of the pitch of the pixel trios to reduce moiré interference attributable to the interference between the minute structure of the screen, which will be described later, and the periodic arrangement of the pixel trios.

Although the lenticular lenses 62' shown in FIG. 20 are of a negative power type (concave lenses), the lenticular lenses 62' may be of a positive power type. The constituent features of the fourteenth embodiment are the lenticular lenses formed on the exit surface of the liquid crystal panel, the diverging angle of the lenticular lenses is in the range of 0.7 W/T to 1.5 W/T rad, where W is the pitch of the arrangement of pixels and T is the distance between the pixels and the projection lens 5. As is obvious from the foregoing expression (10), moiré interference can be remarkably reduced.

Fifteenth Embodiment

Figure 21A:
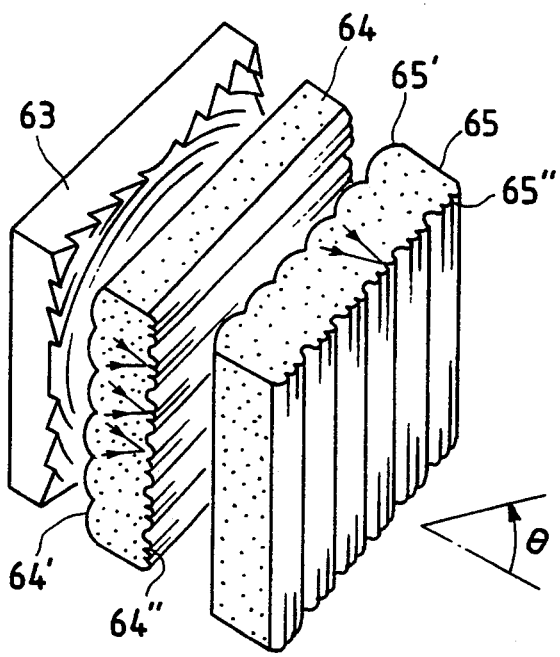
FIGS. 21a, 21b and 21c are a fragmentary perspective view of a liquid crystal projection display in a fifteenth embodiment according to the present invention and graphs of assistance in explaining the fifteenth embodiment, respectively.
Figure 21B:
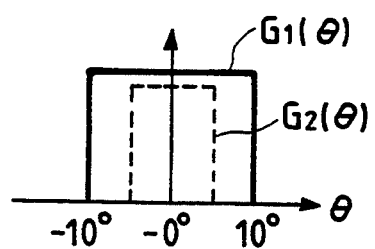
Figure 21C:
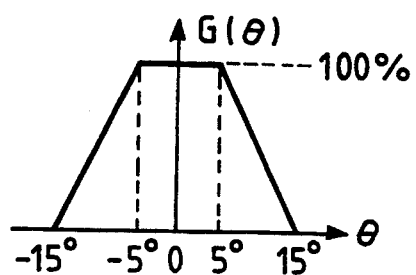

A liquid crystal projection display in a fifteenth embodiment according to the present invention employs a multilayer screen shown in FIG. 21a, comprising a collimating Fresnel lens 63, a both-sided horizontal lenticular lens plate 64 for vertical divergence and a both-sided vertical lenticular lens plate 65 for horizontal divergence. In FIG. 21b, continuous lines $G_2(\theta)$ represent the vertical directivity of lenticular lenses 64' on the entrance side and dotted lines $G_2(\theta)$ represent the vertical directivity of minute lenticular lenses 64" on the exit side. FIG. 21c shows the overall vertical directivity $G(\theta)$ of the both-sided horizontal lenticular lens plate 64. When specified conditions, which will be described later, are met, the overall vertical directivity $G(\theta)$ can be obtained by the convolution of $G_1(\theta)$ and $G_2(\theta)$ on the basis of the convolution theorem. As shown in FIG. 21b, a single-sided lenticular lens plate has a sharp cut-off directivity and hence unsuitable for practical application. The both-sided lenticular lens plate 64 having the cascaded lenticular lenses 64' and 64" has a remote cut-off characteristics, which is suitable for practical application. To obtain the overall vertical directivity $G(\theta)$ by the convolution of $G_1(\theta)$ and $G_2(\theta)$, the pitch of the minute lenticular lenses must be smaller than the width of spread of the image of the pupil of the projection lens. The width of spread of the image of the pupil of the projection lens can be increased by particles dispensed in the lenticular lens plate 64. When the thickness of the lenticular lens plate 64 is 3 mm and the pitch of the lenticular lenses on the entrance side of the lenticular lens plate 64 is 0.7 mm, the width of spread is about 0.1 mm. Therefore, the pitch of the minute lenticular lenses 64" is about 0.1 mm. Generally, the pitch of the minute lenticular lenses 64" on the exit side is about 1/7 of that of the lenticular lenses 64' on the entrance side.

Sixteenth Embodiment

FIG. 22a shows a liquid crystal projection display in a sixteenth embodiment according to the present invention and FIG. 22b shows a modification of the sixteenth embodiment. The sixteenth embodiment comprises the foregoing optical system of the present invention and mirrors for deflecting the light passages of the optical system. As shown in FIG. 22a, the liquid crystal projection display comprises a light source 1, a liquid lens 219 consisting of a Fresnel lens 2 and a liquid 19, a composite liquid crystal panel 342 consisting of a liquid crystal panel 3, a Fresnel lens 4, and an adhesive 32 adhesively joining together the liquid crystal panel 3 and the Fresnel lens 4, a projection lens 5, a screen 6 and deflecting mirrors represented by hatched parts. The liquid crystal projection display provided with the deflecting mirrors can be formed in a compact construction. The suitable diagonal length of the screen 6 is in the range of 35 in. to 70 in.

Seventeenth Embodiment

Figure 23:
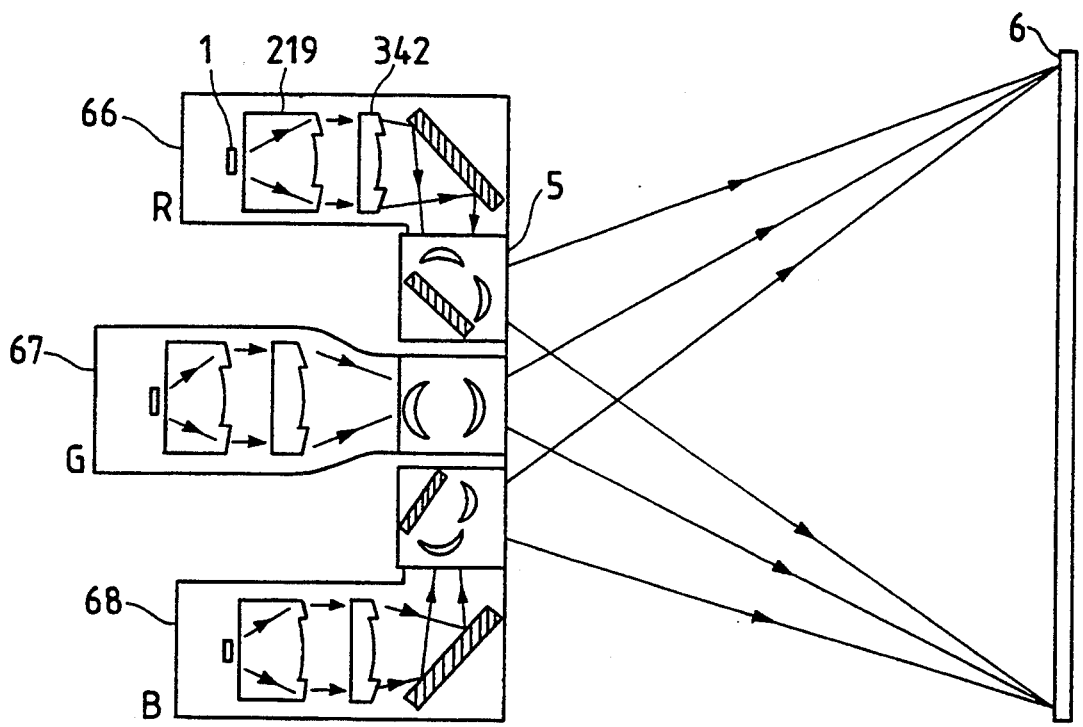
FIG. 23 is a typical sectional view of a liquid crystal projection display in a seventeenth embodiment according to the present invention.

FIG. 23 shows a liquid crystal projection display in a seventeenth embodiment according to the present invention. This liquid crystal projection display is provided with three projectors 66, 67 and 68, which are operated in parallel. This configuration is suitable for liquid crystal projection displays having a screen of 100 in. or above in diagonal length.

Eighteenth Embodiment

Figure 24:
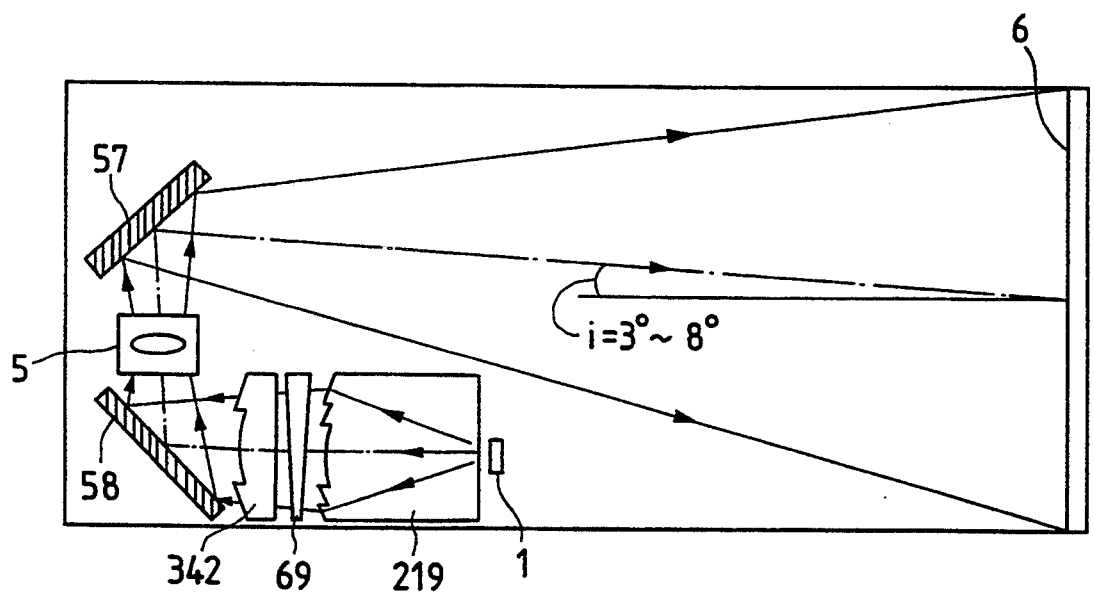
FIG. 24 is a typical sectional view of a liquid crystal projection display in an eighteenth embodiment according to the present invention.

FIG. 24 shows a liquid crystal projection display in an eighteenth embodiment according to the present invention. The eighteenth embodiment is a liquid crystal projection display of a unit display type provided with a screen of about 50 in. in diagonal length. The liquid crystal projection display is provided with mirrors 57 and 58 and a prism 69 to incline light rays transmitted through the liquid crystal panel at an angle in the range of about 3° to about 8° so that the light rays coincide with the optical axis of the liquid crystal panel. As is generally known, the optical axis of a TN liquid crystal panel optimal for tone reproduction is inclined at an angle in the range of about 3° to about 8° to the normal to the liquid crystal panel. Inclination of the projected light rays and the use of the mirrors 57 and 58 enables the liquid crystal projection display to be formed in a compact construction.

A huge multiscreen display can be formed by arranging a plurality of display units like the display unit of the eighteenth embodiment in a matrix.

Nineteenth Embodiment

Figure 25A:
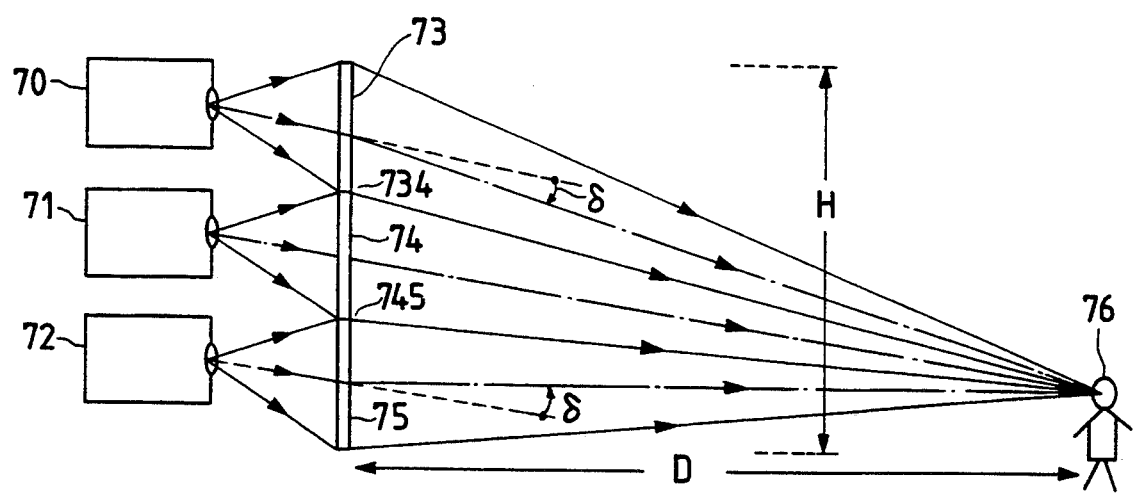
FIGS. 25a and 25b are diagrammatic views of assistance in explaining a liquid crystal projection display in a nineteenth embodiment according to the present invention.

FIG. 25a shows a multiscreen liquid crystal projection display in a nineteenth embodiment according to the present invention. The multiscreen liquid crystal projection display is provided with three projectors 70, 71 and 72, and screens 73, 74 and 75. In FIG. 25a, indicated at 76 is a principal viewing position. When principal light rays are emitted from the screens 73, 74 and 75 toward the principal viewing position 76 as shown in FIG. 25a, the entire areas of the screens 73, 74 and 75 can be clearly seen from the principal viewing position. When principal light rays are thus emitted, no detrimental brightness step can be seen on the boundaries between the screens 73 and 74 and between the screens 74 and 75 even if the screens 73, 74 and 75 are viewed from a position other than the principal viewing position 76.

Figure 25B:
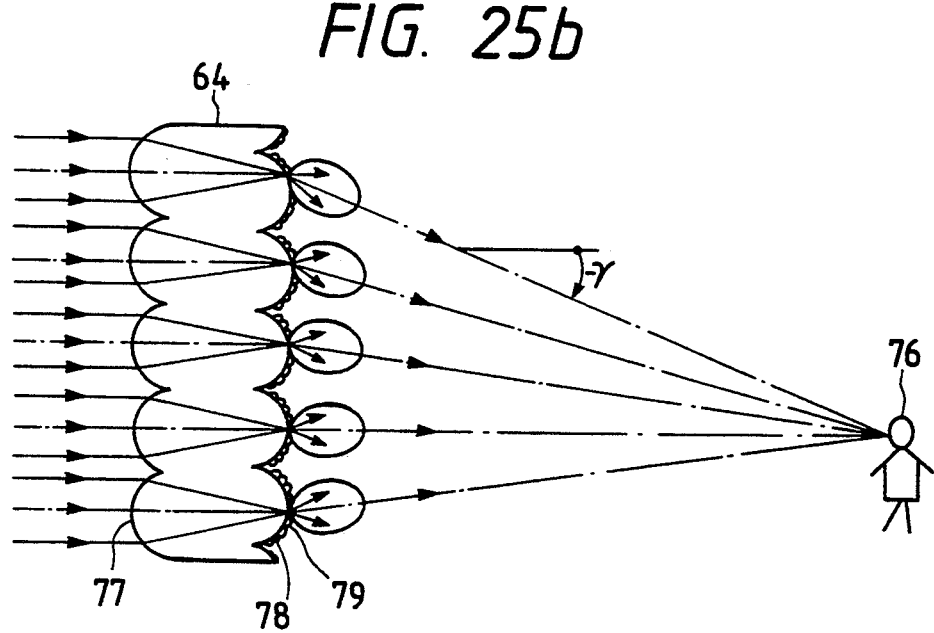

The nineteenth embodiment employs, as a means for directing principal light rays toward the principal viewing position 76, the both-sided horizontal lenticular lens plate 64 of the multilayer screen of FIG. 21a. FIG. 25b is an enlarged fragmentary sectional view of the both-sided horizontal lenticular lens plate 64. The both-sided horizontal lenticular lens plate 64 has entrance lenticular lenses 77 for vertical divergence and an exit composite lenticular lenses each consisting of a converging lenticular lens 78 for general vertical convergence and minute lenticular lenses 79 for local, vertical divergence formed on the surface of each converging lenticular lens 78. The effect of local, vertical divergence has been previously described with reference to FIGS. 21b and 21c. The effect of general vertical convergence will be described hereinafter. The converging lenticular lenses 78 are arranged at a pitch smaller than that of the entrance lenticular lenses 77 to converge light rays generally toward the principal viewing position 7776 as shown in FIG. 25b. The converging lenticular lenses 78 can be designed by using the Fresnel lens designing formula (1).

Figure 26A:
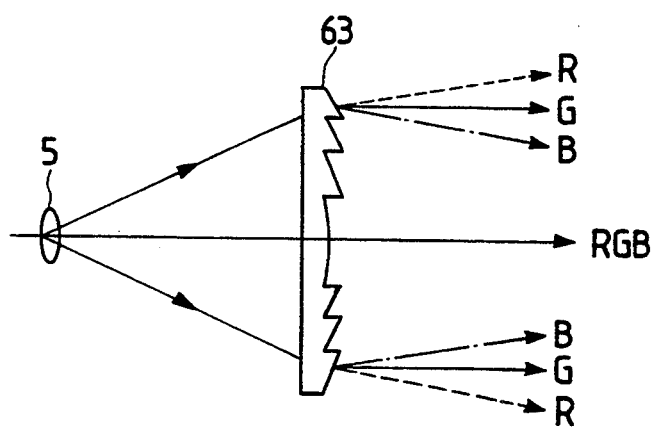
FIGS. 26a and 26b are diagrammatic views of the nineteenth embodiment.
Figure 26B:
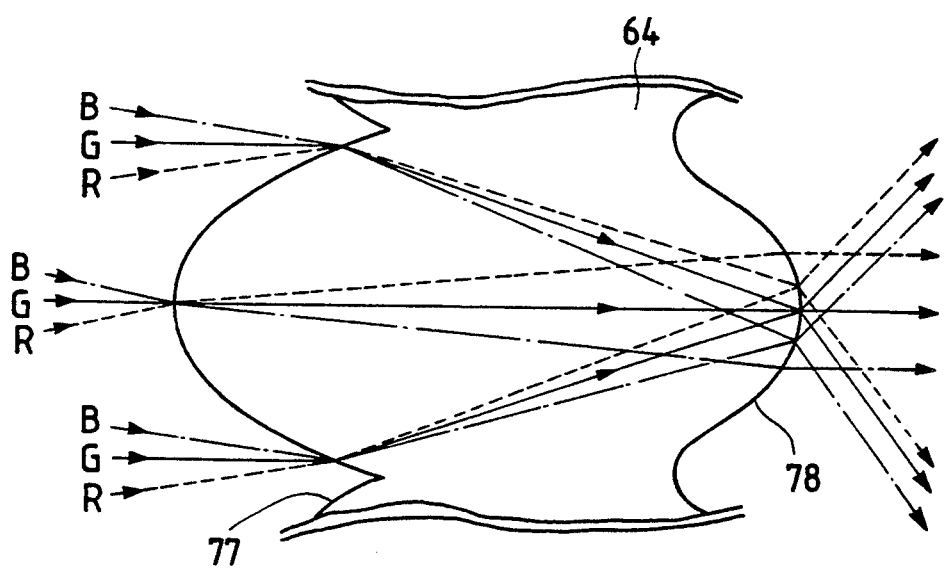

The effect of the nineteenth embodiment will be supplemented with reference to FIGS. 26a and 26b. In FIG. 26a, there are shown a projection lens 5, and a Fresnel lens plate 63 (the Fresnel lens 63 of FIG. 21a), i.e., one of the components of the screen. As is generally known, the refractive index of a material, such as an acrylic resin, forming a Fresnel lens plate is relatively small for red light rays R and is relatively large for blue light rays B. Therefore, such a Fresnel lens plate deflects red light rays R, green light rays G and blue light rays B in directions indicated by the arrows R, G and B in FIG. 26a, causing chromatic aberration. Accordingly, if the screen is looked at from below the screen, the upper area of the screen looks bluish and the lower area of the screen looks reddish.

The horizontal lenticular lens plate 64 of FIG. 25b is shown in an enlarged, fragmentary sectional view in FIG. 26b, in which the minute lenticular lenses 79 for local, vertical divergence are omitted for simplicity. Although red light rays R, green light rays G and blue light rays B transmitted through the Fresnel lens plate 63 cross obliquely each other and travel in difference directions, respectively, in the both-sided horizontal lenticular lens plate 64, the converging lenticular lenses 78 make the red light rays R, the green light rays G and the blue light rays B travel in parallel to each other, so that the upper and lower areas of the screen will not look in unusual colors even if the screen is looked at from below the same and hence images are displayed on the screen in natural colors.

As is obvious from the foregoing description, the constituent features of the screen employed in the fifteenth, sixteenth and seventeenth embodiments (FIGS. 21a, 22a and 23) are as follows.

The screen comprises the collimating Fresnel lens plate, the both-sided horizontal lenticular lens plate for vertical divergence, and a both-sided vertical lenticular lens plate for horizontal divergence, the both-sided horizontal lenticular lens plate is provided with the horizontal lenticular lenses for vertical divergence on its entrance surface, and composite horizontal lenticular lenses, each consisting of the converging lenticular lens for vertical convergence and minute lenticular lenses for vertical divergence formed on the surface of the lenticular lens, on its exit surface, the pitch of the converging lenticular lenses for vertical convergence formed on the exit surface of the both-sided horizontal lenticular lens plate is smaller than that of the horizontal lenticular lenses for vertical divergence formed on the entrance surface of the same, and the pitch of the minute lenticular lenses is about 1/7 or below of the pitch of the horizontal lenticular lenses.

Twentieth Embodiment

Figure 27A:
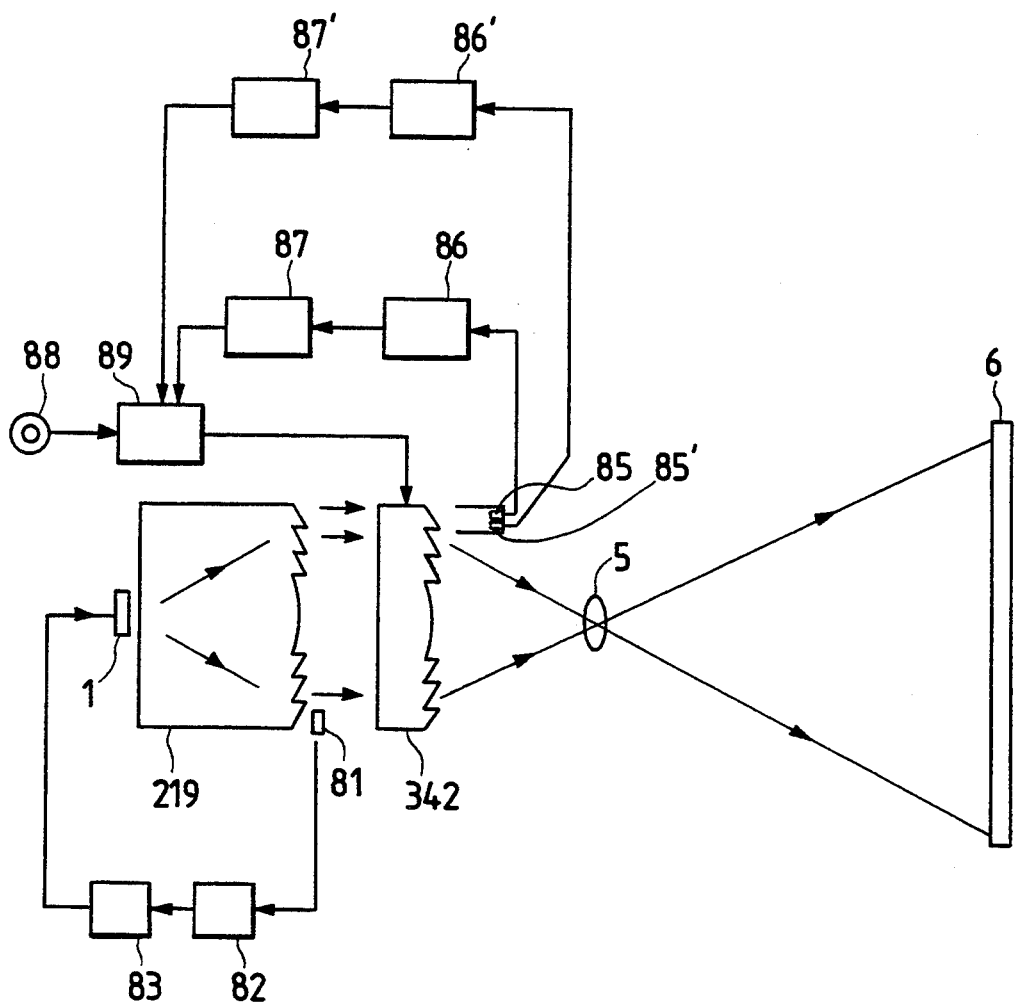
FIGS. 27a and 27b are block diagrams of a liquid crystal projection display in a twentieth embodiment according to the present invention.

A liquid crystal projection display in a twentieth embodiment according to the present invention shown in FIG. 27a incorporates a means effective particularly for reducing the brightness difference between the component projectors of a multiscreen liquid crystal projection display. This means is also effective for cancelling the temperature dependence of the gradation control characteristics of a stand-alone liquid crystal panel.

Shown in FIG. 27a are a light source 1, a liquid lens 219, a composite liquid crystal panel 347, a projection lens 5, a screen 6, a photodetector 81, such as a photodiode, detecting circuits 82, 86 and 86', such as detecting resistors, control circuits 83, 87 and 87', an image signal input terminal 88 and an image signal processing circuit 89.

Figure 28:
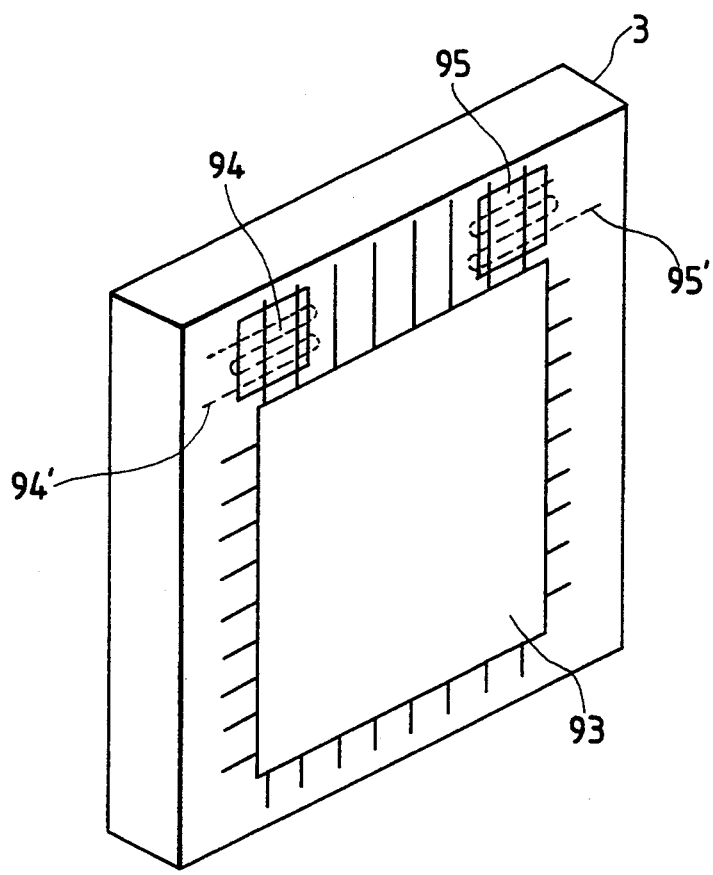
FIG. 28 is a perspective view of assistance in explaining the twentieth embodiment.

The photodetector 81 converts light into a current, the detecting circuit converts the current produced by the photodetector 81 into a corresponding voltage, and the control circuit 83 controls the light source 1 in a feedback control mode. Also shown in FIG. 27a are a black level light detector 85 for detecting an output light strength corresponding to a black level signal and a white level light detector 85' for detecting an output light strength corresponding to a white level signal. The black level light detector 85 and the white level light detector 85' are disposed opposite to the exit surface of the composite liquid crystal panel 342. In FIG. 28, indicated at 92 is an image forming region. Pixels are formed respectively at the intersections of a plurality of row lines and column lines. The black level light detector 85 (FIG. 27a) detects light emitted from a black level detecting region 94. In FIG. 28, a dotted line 94' represents a row line specially for black level detection. The white level light detector 85' detects light emitted from a white level detecting region 95. In FIG. 28, a dotted line 95' is a row line specially for white level detection. An address voltage is applied to the row lines 94' and 95' during a vertical blanking interval. Therefore, application of the address voltage to the row lines 94' and 95' will not affect adversely the image forming process which is carried out during a forward vertical scanning period.

Figure 27B:
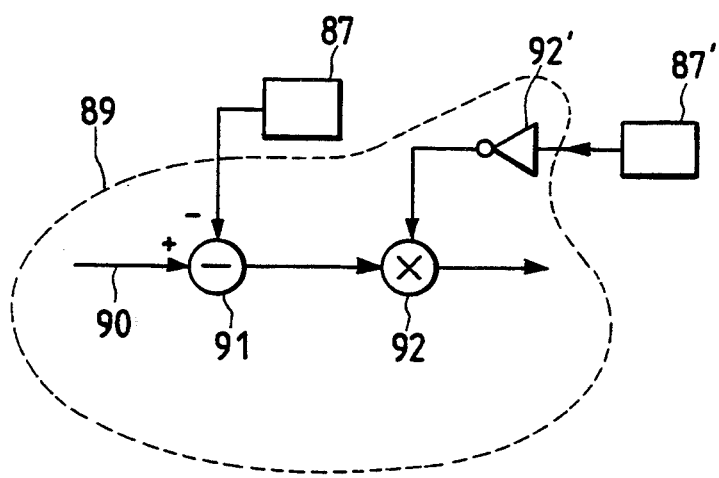

FIG. 27b shows a part of the image signal processing circuit 89. Shown in FIG. 27b are an image signal 90, a subtracter 91 for increasing or decreasing a black level signal, a multiplier 92 for amplifying or attenuating a white level signal, and a polarity inverter 92'.

The black level light detector 85, the detecting circuit 86, the control circuit 87 and the subtracter 91 function for feedback control to stabilize black level light. If the intensity of the black level light is excessively high, the output voltage of the black level light detecting circuit 86 increases, consequently, the output voltage of the control circuit 87 increases and the output voltage of the subtracter 91 decreases. The output signal of the subtracter 91 is transferred through the multiplier 92 to the liquid crystal panel to reduce the intensity of the black level light.

The white level light detector 85', the detecting circuit 86', the control circuit 87', the polarity inverter 92' and the multiplier 92 function for feedback control to stabilize the white level light. If the intensity of the white level light is excessively high, the output voltage of the white level light detecting circuit 86' increases and the output voltage of the control circuit 87' increases accordingly. Consequently, the output voltage of the polarity inverter 92' (FIG. 27b) decreases, the output voltage of the multiplier 92 decreases and, consequently, the intensity of the while level light decreases accordingly.

Thus, the liquid crystal projection display in the twentieth embodiment has excellent stability against the variation of ambient conditions including ambient temperature. The configuration of the twentieth embodiment is applicable to displaying color images, in which the twentieth embodiment operates in the foregoing feedback control mode for each of red color signals, green light signals and blue light signals.

The present invention is not limited to the foregoing individual embodiments; the present invention may be a combination of some of the foregoing embodiments.

The first to eighth embodiments of the present invention are capable of enhancing the relative corner illuminance without deteriorating the light capturing efficiency or of improving the light capturing efficiency without reducing the relative corner illuminance.

The ninth, tenth and thirteenth embodiments (FIGS. 13, 14 and 16) of the present invention are capable of suppressing ghost interference.

The fourteenth and fifteenth embodiments (FIGS. 17a to 17c and 18) of the present invention are capable of suppressing moirë interference.

The sixteenth, seventeenth, eighteenth and nineteenth embodiments (FIGS. 19a to 19c, 20, 21a to 21c and 22a to 22c) are applicable to various liquid crystal projection displays of a stand-alone type, a parallel drive type and a multiscreen type and to those provided with screens of different sizes.

The twentieth embodiment (FIGS. 27a and 27b) of the present invention has improved stability in tone reproduction.

Thus the present invention provides liquid crystal projection displays capable of displaying images in high picture quality and of being used in various fields.

What is claimed is:

1. A liquid crystal projection display comprising:
 a light source means;
 a liquid crystal panel means including a liquid crystal panel;
 a projection lens means;
 a screen means;
 a first optical system disposed on an entrance side of said liquid crystal panel and having a peripheral illuminance enhancing means comprising a first light converging means disposed relatively remote from said light source means, and a second light converging means disposed relatively near to said light source means to enhance a ratio of illuminance of a peripheral region of an entrance surface of said first light converging means to that of a central region of the same;
 wherein said first light converging means comprises a first Fresnel lens means, said second light converging means comprises a second Fresnel lens means, and a light converging power of said central region of said first Fresnel lens means is higher than that of said peripheral region of the same.

2. A liquid crystal projection display comprising:
 a light source means;
 a liquid crystal panel means including a liquid crystal panel;
 a projection lens means;
 a screen means;
 a first optical system disposed on an entrance side of said liquid crystal panel and having a peripheral illuminance enhancing means comprising a first light converging means disposed relatively remote from said light source means, and a second light converging means disposed relatively near to said light source means to enhance a ratio of illuminance of a peripheral region of an entrance surface of said first light converging means to that of a central region of the same;

wherein said first light converging means comprises a first Fresnel lens means, said second light converging means comprises a second Fresnel lens means, and a light converging power of said central region of said first Fresnel lens means is higher than that of said peripheral region of the same, wherein said peripheral region of said first Fresnel lens means is bent toward said light source means so that said first Fresnel lens means is concave toward said light source means.

3. A liquid crystal projection display according to claim 2, wherein said light source means comprises a point light source and an ellipsoidal mirror, said point light source is disposed near one of a foci of said ellipsoidal mirror, and a transparent plate is disposed near a different focus of said ellipsoidal mirror.

4. A liquid crystal projection display comprising:
a light source means;
a liquid crystal panel means including a liquid crystal panel;
a projection lens means;
a screen means;
a first optical system disposed on an entrance side of said liquid crystal panel and having a peripheral illuminance enhancing means comprising a first light converging means disposed relatively remote from said light source means, and a second light converging means disposed relatively near to said light source means to enhance a ratio of illuminance of a peripheral region of an entrance surface of said first light converging means to that of a central region of the same;
wherein said first light converging means comprises a first Fresnel lens means, said second light converging means comprises a second Fresnel lens means, and a light converging power of said central region of said first Fresnel lens means is higher than that of said peripheral region of the same, further comprising a liquid lens means, wherein said first light converging means is a transparent plate forming an entrance surface of said liquid lens means, and said second light converging means is a lens means forming an exit surface of said liquid lens.

5. A liquid crystal projection display comprising:
a light source means;
a liquid crystal panel means including a liquid crystal panel;
a projection lens means;
a screen means;
a first optical system disposed on an entrance side of said liquid crystal panel and having a peripheral illuminance enhancing means comprising a first light converging means disposed relatively remote from said light source means, and a second light converging means disposed relatively near to said light source means to enhance a ratio of illuminance of a peripheral region of an entrance surface of said first light converging means to that of a central region of the same;

wherein said first light converging means comprises a first Fresnel lens means, said second light converging means comprises a second Fresnel lens means, and a light converging power of said central region of said first Fresnel lens means is higher than that of said peripheral region of the same, wherein a second optical system is disposed on an exit side of said liquid crystal panel, and said second optical system comprises a Fresnel lens means disposed near said liquid crystal panel means, and said Fresnel lens means and said liquid crystal panel means are joined together with a transparent material having a refractive index in a range of 1.4 to 1.6.

6. A liquid crystal projection display according to claim 5, wherein said second optical system has a Fresnel lens means disposed near said liquid crystal panel means, and minute elements forming an exit surface of said Fresnel lens have a curving angle in a range of 0.04 to 0.2 rad.

7. A liquid crystal projection display comprising, as principal components: a light source means; a liquid crystal panel means including a liquid crystal panel; a projection lens means; and a screen means;
the improvement comprising a lenticular lens means disposed on the exit side of the liquid crystal panel means having lenticular lenses having a diverging angle in the range of 0.7 times to 1.5 times the ratio of the pitch of the pixels of the liquid crystal panel to the distance between a plane on which the pixels are arranged and a plane including the lenticular lenses.

8. A liquid crystal projection display comprising:
a light source means;
a liquid crystal panel means including a liquid crystal panel;
a projection lens means;
and a screen means;
a black level light detecting means and a photodetector means for detecting an output light strength corresponding to a black level signal provided on the exit surface of said liquid crystal panel;
a detecting circuit means;
an image signal processing circuit means;
and a control means for controlling said liquid crystal panel so that an output of said photodetector means is made constant.

* * * * *